(12) United States Patent
Hattori et al.

(10) Patent No.: US 10,800,162 B2
(45) Date of Patent: Oct. 13, 2020

(54) NON-AQUEOUS INK JET COMPOSITION

(71) Applicant: Seiko Epson Corporation, Tokyo (JP)

(72) Inventors: Shugo Hattori, Shiojiri (JP); Naoki Koike, Matsumoto (JP); Jun Ito, Shimosuwa (JP); Kenichiro Kubota, Matsumoto (JP)

(73) Assignee: Seiko Epson Corporation (JP)

( * ) Notice: Subject to any disclaimer, the term of this patent is extended or adjusted under 35 U.S.C. 154(b) by 170 days.

(21) Appl. No.: 15/415,046

(22) Filed: Jan. 25, 2017

(65) Prior Publication Data

US 2017/0210925 A1    Jul. 27, 2017

(30) Foreign Application Priority Data

Jan. 27, 2016  (JP) ................. 2016-013484
Jan. 27, 2016  (JP) ................. 2016-013534

(51) Int. Cl.
*B41J 2/01* (2006.01)
*B41J 2/21* (2006.01)
(Continued)

(52) U.S. Cl.
CPC ............... *B41J 2/01* (2013.01); *B41J 2/2107* (2013.01); *C09D 11/033* (2013.01);
(Continued)

(58) Field of Classification Search
CPC ..... C09D 11/36; C09D 11/322; C09D 11/037; C09D 11/033; C09D 11/10; C09D 11/40; C09D 11/30; C09D 11/38; C09D 11/32; C09D 11/324; C09D 11/328; C09D 11/101; C09D 11/102; C09D 11/005; C09D 11/54; C09D 11/52; B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012;
(Continued)

(56) References Cited

U.S. PATENT DOCUMENTS 6,048,390 A    4/2000  Yano et al.
6,613,136 B1   9/2003  Arita et al.
(Continued)

FOREIGN PATENT DOCUMENTS

CN    102233719 A    11/2011
CN    102532986 A    7/2012
(Continued)

OTHER PUBLICATIONS

Extended European Search Report for Application No. EP 17 15 3615 dated Apr. 20, 2017 (8 pages).
(Continued)

*Primary Examiner* — Manish S Shah
(74) *Attorney, Agent, or Firm* — Harness, Dickey & Pierce, P.L.C.

(57) ABSTRACT

A non-aqueous ink jet composition includes a pigment component containing a diketopyrrolopyrrole pigment and an organic solvent. The organic solvent contains a glycol ether. The amount of water in the non-aqueous ink jet composition is 10 mass % or less based on the total amount of the non-aqueous ink jet composition.

11 Claims, 1 Drawing Sheet

(51) Int. Cl.
  *C09D 11/38*   (2014.01)
  *C09D 11/033*  (2014.01)
  *C09D 11/037*  (2014.01)
  *C09D 11/106*  (2014.01)
  *C09D 11/322*  (2014.01)
  *C09D 11/36*   (2014.01)

(52) U.S. Cl.
  CPC .......... *C09D 11/037* (2013.01); *C09D 11/106* (2013.01); *C09D 11/322* (2013.01); *C09D 11/36* (2013.01); *C09D 11/38* (2013.01)

(58) Field of Classification Search
  CPC ............... B41J 2/04598; B41J 2/04588; B41J 2/04595; B41J 2/04586; B41J 2/14274; B41J 11/0015; B41J 11/002; B41J 2/161; B41J 2/1623; B41J 2202/00; B41J 2202/03; B41J 2/14201; B41J 2/045; B41M 5/0011; B41M 5/0017; B41M 5/0047; B41M 7/00; B41M 7/0072; B41M 5/52; B41M 5/5218
  See application file for complete search history.

(56) References Cited

U.S. PATENT DOCUMENTS

| | | | |
|---|---|---|---|
| 6,802,893 | B1 | 10/2004 | Komatsu et al. |
| 7,125,447 | B2 | 10/2006 | Sugita et al. |
| 7,806,972 | B2 | 10/2010 | Sugita et al. |
| 7,871,467 | B2 | 1/2011 | Sano et al. |
| 7,897,657 | B2 | 3/2011 | Nakano et al. |
| 8,016,931 | B2 | 9/2011 | Mizutani et al. |
| 8,216,356 | B2 | 7/2012 | Nishikawa |
| 8,440,745 | B2 | 5/2013 | Kotera et al. |
| 8,474,967 | B2 | 7/2013 | Aoki et al. |
| 8,586,656 | B2 | 11/2013 | Shiotani et al. |
| 8,991,996 | B2 | 3/2015 | Nagase et al. |
| 9,028,055 | B2 | 5/2015 | Kubota et al. |
| 9,056,992 | B2 | 6/2015 | Sao et al. |
| 9,151,874 | B2 | 10/2015 | Taima et al. |
| 9,193,882 | B2 | 11/2015 | Aruga et al. |
| 9,238,744 | B2 | 1/2016 | Kubota et al. |
| 9,650,529 | B2 | 5/2017 | Murai et al. |
| 9,725,610 | B2 | 8/2017 | Iida et al. |
| 9,758,685 | B2 | 9/2017 | Ito et al. |
| 9,758,686 | B2 | 9/2017 | Nagase et al. |
| 9,804,308 | B2 | 10/2017 | Nakajima |
| 10,400,124 | B2 | 9/2019 | Kubota et al. |
| 2003/0019398 | A1* | 1/2003 | Komatsu ............ C09B 67/0008 106/412 |
| 2003/0116055 | A1 | 6/2003 | Kubota et al. |
| 2004/0066438 | A1 | 4/2004 | Taguchi et al. |
| 2004/0266907 | A1 | 12/2004 | Sugita et al. |
| 2005/0020717 | A1 | 1/2005 | Sasa |
| 2005/0124726 | A1* | 6/2005 | Yatake ................... C09D 11/30 523/160 |
| 2007/0120920 | A1* | 5/2007 | Taguchi ............... C09D 11/328 347/100 |
| 2007/0270525 | A1 | 11/2007 | Sugita et al. |
| 2007/0293601 | A1 | 12/2007 | Ushiku et al. |
| 2008/0081119 | A1 | 4/2008 | Oyanagi et al. |
| 2008/0097005 | A1 | 4/2008 | Shiotani |
| 2008/0166655 | A1 | 7/2008 | Ogata et al. |
| 2008/0173214 | A1* | 7/2008 | Oyanagi ............... C09D 11/36 106/31.25 |
| 2008/0308006 | A1* | 12/2008 | Deroover ............ C09B 57/004 106/31.78 |
| 2009/0011264 | A1 | 1/2009 | Ohkubo et al. |
| 2009/0029119 | A1 | 1/2009 | Nishikawa |
| 2009/0030144 | A1 | 1/2009 | Mizutani et al. |
| 2009/0088495 | A1 | 4/2009 | Mikami et al. |
| 2009/0090271 | A1 | 4/2009 | Wynants et al. |
| 2009/0118418 | A1 | 5/2009 | Nakano et al. |
| 2009/0169834 | A1 | 7/2009 | Sano et al. |
| 2009/0235843 | A1 | 9/2009 | Sugita et al. |
| 2009/0305156 | A1 | 12/2009 | Weber et al. |
| 2010/0029813 | A1* | 2/2010 | Deroover ............ C09D 11/101 524/93 |
| 2010/0047455 | A1* | 2/2010 | Hoogmartens ........ C09D 11/40 427/258 |
| 2010/0073450 | A1 | 3/2010 | Katagami et al. |
| 2010/0083875 | A1 | 4/2010 | Nakao |
| 2010/0093900 | A1 | 4/2010 | Ohya et al. |
| 2010/0174013 | A1 | 7/2010 | Sugita et al. |
| 2010/0265309 | A1 | 10/2010 | Kaneko et al. |
| 2010/0280158 | A1 | 11/2010 | Shiotani et al. |
| 2011/0009537 | A1 | 1/2011 | Kotera et al. |
| 2011/0143275 | A1 | 6/2011 | Obata et al. |
| 2011/0234728 | A1 | 9/2011 | Aoki et al. |
| 2011/0242241 | A1 | 10/2011 | Chun et al. |
| 2011/0292141 | A1 | 12/2011 | Sao et al. |
| 2011/0315049 | A1 | 12/2011 | Aoki et al. |
| 2012/0056929 | A1 | 3/2012 | Sao et al. |
| 2012/0306964 | A1 | 12/2012 | Nakajima |
| 2013/0050365 | A1 | 2/2013 | Irita |
| 2013/0100523 | A1 | 4/2013 | Taima et al. |
| 2013/0120492 | A1 | 5/2013 | Kubota et al. |
| 2013/0194362 | A1* | 8/2013 | Sao ..................... C09D 11/36 347/100 |
| 2013/0250406 | A1 | 9/2013 | Nakajima |
| 2013/0310496 | A1 | 11/2013 | Shiotani et al. |
| 2014/0333696 | A1 | 11/2014 | Nagase et al. |
| 2014/0349087 | A1 | 11/2014 | Jung et al. |
| 2015/0015118 | A1 | 1/2015 | Kamijo |
| 2015/0184011 | A1 | 7/2015 | Shimura et al. |
| 2015/0210878 | A1 | 7/2015 | Iida et al. |
| 2016/0115330 | A1 | 4/2016 | Koike et al. |
| 2016/0168405 | A1 | 6/2016 | Ito et al. |
| 2016/0208105 | A1* | 7/2016 | Nishiura ................. C08F 8/30 |
| 2016/0222229 | A1 | 8/2016 | Yamada et al. |
| 2016/0222235 | A1 | 8/2016 | Iida et al. |
| 2016/0237291 | A1 | 8/2016 | Nagase et al. |
| 2016/0264805 | A1 | 9/2016 | Nagase et al. |
| 2017/0210923 | A1 | 7/2017 | Kubota et al. |
| 2017/0210924 | A1 | 7/2017 | Kubota et al. |
| 2017/0210925 | A1 | 7/2017 | Hattori et al. |
| 2017/0218216 | A1 | 8/2017 | Kubota et al. |
| 2018/0037761 | A1 | 2/2018 | Iida et al. |
| 2018/0057701 | A1 | 3/2018 | Kubota et al. |

FOREIGN PATENT DOCUMENTS

| | | | |
|---|---|---|---|
| EP | 1 790 698 | A1 | 5/2007 |
| EP | 1857510 | A1 | 11/2007 |
| EP | 1992670 | A1 | 11/2008 |
| EP | 2025725 | A1 | 2/2009 |
| EP | 2 105 476 | A2 | 9/2009 |
| EP | 2 492 321 | A1 | 8/2012 |
| EP | 2597497 | A1 | 5/2013 |
| EP | 2650706 | A1 | 10/2013 |
| EP | 3012299 | A1 | 4/2016 |
| EP | 3034571 | A1 | 6/2016 |
| EP | 3 199 598 | A1 | 8/2017 |
| EP | 3263658 | A1 | 1/2018 |
| JP | H11-310714 | A | 11/1999 |
| JP | 2004-070048 | A | 3/2004 |
| JP | 2004-306441 | A | 11/2004 |
| JP | 2004-352917 | A | 12/2004 |
| JP | 2006-243588 | A | 9/2006 |
| JP | 2007-023265 | A | 2/2007 |
| JP | 2007-177190 | A | 7/2007 |
| JP | 2007-204718 | A | 8/2007 |
| JP | 2007-297634 | A | 11/2007 |
| JP | 2007-314635 | A | 12/2007 |
| JP | 2008-007774 | A | 1/2008 |
| JP | 2008-075044 | A | 4/2008 |
| JP | 2008-075067 | A | 4/2008 |
| JP | 2008-233314 | A | 10/2008 |
| JP | 2008-250188 | A | 10/2008 |
| JP | 2009-001691 | A | 1/2009 |
| JP | 2009-024072 | A | 2/2009 |
| JP | 2009-052030 | A | 3/2009 |
| JP | 2009-173853 | A | 8/2009 |

(56) References Cited

FOREIGN PATENT DOCUMENTS

| | | |
|---|---|---|
| JP | 2009-227812 A | 10/2009 |
| JP | 2009-235383 A | 10/2009 |
| JP | 2010-018730 A | 1/2010 |
| JP | 2010-043149 A | 2/2010 |
| JP | 2010-150314 A | 7/2010 |
| JP | 2010-168583 A | 8/2010 |
| JP | 2010-270225 A | 12/2010 |
| JP | 2011-006541 A | 1/2011 |
| JP | 2011-046759 A | 3/2011 |
| JP | 2011-246571 A | 12/2011 |
| JP | 2012-012432 A | 1/2012 |
| JP | 2012-046671 A | 3/2012 |
| JP | 2013-104009 A | 5/2013 |
| JP | 2013-177597 A | 9/2013 |
| JP | 2014-091795 A | 5/2014 |
| JP | 2014-132050 A | 7/2014 |
| JP | 2014-237803 A | 12/2014 |
| JP | 2015-019142 A | 1/2015 |
| JP | 2015-140399 A | 8/2015 |
| JP | 2016-113531 A | 6/2016 |
| JP | 2016-141746 A | 8/2016 |
| JP | 2016-150985 A | 8/2016 |
| JP | 2016-155909 A | 9/2016 |
| JP | 2016-155910 A | 9/2016 |
| JP | 2016-166311 A | 9/2016 |
| WO | 2004-007626 A1 | 1/2004 |
| WO | 2007-072804 A1 | 6/2007 |
| WO | 2016-136134 A1 | 9/2016 |

OTHER PUBLICATIONS

Dow Chemical Company Product Information on Glycol Ethers, Form No. 110-00877-702, Jul. 2002 (6 pages).
Sigma-Aldrich Safety Data Sheet for Diethylene glycol diethyl ether, Version 4.11, revised Dec. 11, 2017 (8 pages).
Sigma-Aldrich Safety Data Sheet for Triethylene glycol monobutyl ether, Version 5.4. revised Jan. 5, 2017, (7 pages).
Isao Hashimoto, Organic Pigments Handbook, published by Isao Hashimoto, Color Office, Tokyo, Japan, pp. 496-507 (May 2006).
IP.com search.

* cited by examiner

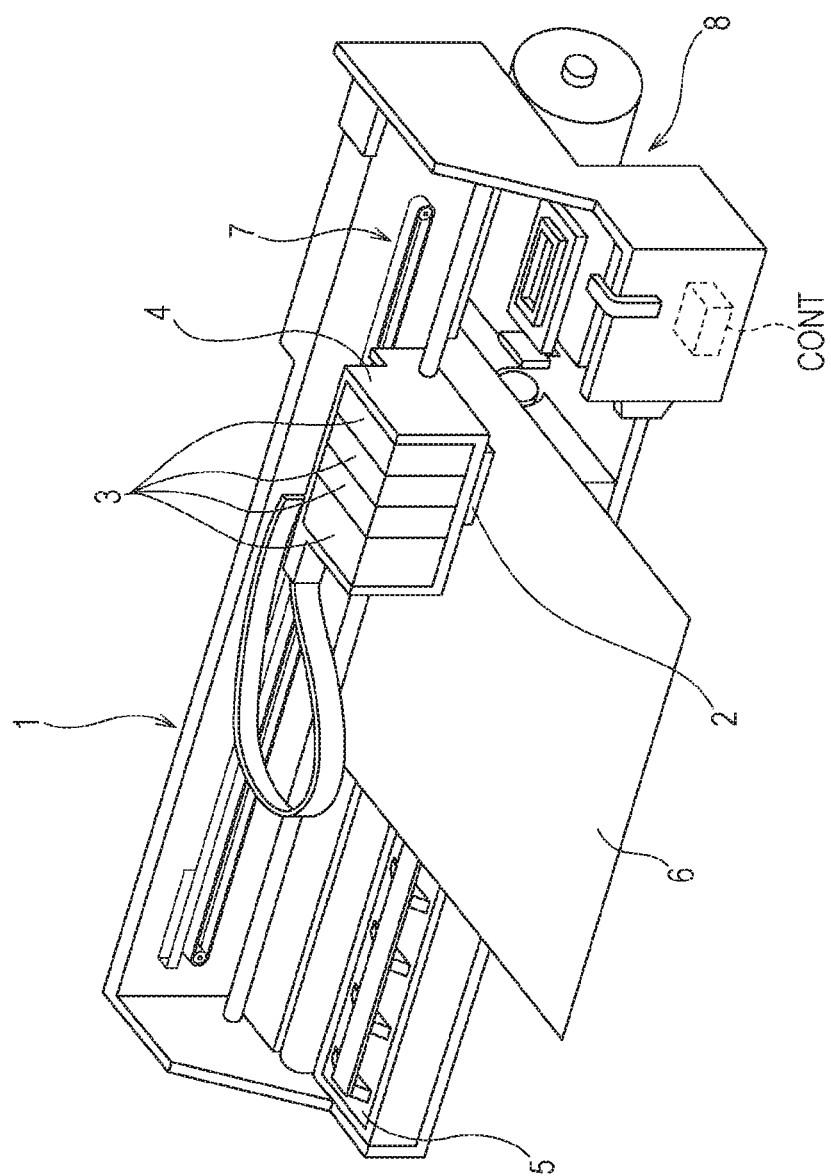

NON-AQUEOUS INK JET COMPOSITION

BACKGROUND

1. Technical Field

The present invention relates to a non-aqueous ink jet composition.

2. Related Art

Ink jet recording methods can record highly fine images with relatively simple apparatuses and have been rapidly developing in various fields. Among them, various studies for more stably giving recorded matters having high quality have been being carried out.

For example, JP-A-2009-227812 is subjected to provide, in particular, an oil-based ink set having high color reproducibility and providing images having high color intensity and discloses an oil-based ink set including a first oil-based ink, a second oil-based ink, and a third oil-based ink each independently having a wavelength region in which the reflectivity on a recording medium changes from 80% to 5% within a wavelength region range of 400 to 700 nm, wherein the reflectivity of the second oil-based ink is successively higher than that of the first oil-based ink in the wavelength region in which the reflectivity of the first oil-based ink changes from 80% to 5%; the reflectivity of the third oil-based ink is successively higher than that of the second oil-based ink in the wavelength region in which the reflectivity of the second oil-based ink changes from 80% to 5%; and the coloring materials in the first oil-based ink, the second oil-based ink, and the third oil-based ink are different from one another.

In addition, for example, JP-A-2010-150314 is subjected to provide an oil-based pigment ink composition having excellent storage stability and discloses an oil-based pigment ink composition at least including a quinacridone pigment, a polymer compound, and an organic sorbent, wherein when ions in the oil-based pigment ink composition are phase-inverted to pure water, the total concentration of monovalent cations in the aqueous phase is 100 ppm or less.

However, the oil-based ink described in JP-A-2009-227812 can form images having high color intensity, but the storage stability is poor due to the pigment contained in the oil-based ink or water contained in the organic solvent as an impurity.

The oil-based pigment ink composition described in JP-A-2010-150314 has excellent storage stability, but cannot form recorded matters having excellent intensity.

SUMMARY

An advantage of some aspects of the invention is to provide a non-aqueous ink jet composition that has excellent storage stability and can form recorded matters having excellent intensity.

The present inventors have diligently studied to solve the above-described problems and, as a result, have found that a non-aqueous ink jet composition including a pigment component at least containing a diketopyrrolopyrrole pigment and a prescribed organic solvent and having a water content not higher than a predetermined amount has excellent storage stability and can form recorded matters having excellent intensity, and have accomplished the present invention.

That is, a first aspect of the present invention relates to a non-aqueous ink jet composition including a pigment component containing a diketopyrrolopyrrole pigment and an organic solvent. The organic solvent contains a glycol ether, and the amount of water in the organic solvent is 10 mass % or less based on the total amount of the non-aqueous ink jet composition. The factors of such a non-aqueous ink jet composition of the present invention that can solve the above-described problems are presumed, but not limited to, as follows: Although the diketopyrrolopyrrole pigment itself has excellent intensity, non-aqueous ink jet compositions including pigment components merely containing the diketopyrrolopyrrole pigment cause uneven aggregation in the recorded matters, resulting in insufficient intensity of the recorded matters. In order to prevent the uneven aggregation, it is conceivable to use a glycol ether in the organic solvent. However, the glycol ether has a high hygroscopic property and is therefore contaminated with a large amount of water as an impurity. In addition, if the non-aqueous ink jet composition including such an organic solvent is left in, for example, the atmospheric air, the composition absorbs water with time. In contrast, a diketopyrrolopyrrole pigment has high hydrophobicity. Accordingly, a non-aqueous ink jet composition containing the pigment relatively readily deteriorates the dispersibility of the pigment by being in contact with water, resulting in poor storage stability. Accordingly, the non-aqueous ink jet composition of the present invention includes both a pigment component containing a diketopyrrolopyrrole pigment and the above-mentioned specific glycol ether and contains water in an amount regulated to 10 mass % or less. As a result, the non-aqueous ink jet composition of the present invention prevents uneven aggregation of the diketopyrrolopyrrole pigment to effectively utilize the excellent intensity of the pigment and also maintains the high dispersibility of the pigment to obtain excellent storage stability.

In the non-aqueous ink jet composition according to the present invention, the amount of water is preferably 2.0 mass % or less and also preferably 0.05 mass % or more based on the total amount of the non-aqueous ink jet composition; the diketopyrrolopyrrole pigment is preferably a diketopyrrolopyrrole red pigment; and the organic solvent preferably contains a glycol diether represented by Formula (1) and a glycol monoether represented by Formula (2):

$$R^1O-(R^3O)_m-R^2 \quad (1)$$

where, $R^1$ and $R^2$ each independently represent an alkyl group having 1 to 7 carbon atoms, $R^3$ represents an alkylene group having 1 to 3 carbon atoms, and m represents an integer of 1 to 7,

$$OH-(R^5O)_n-R^4 \quad (2)$$

where, $R^4$ represents an alkyl group having 1 to 7 carbon atoms, $R^5$ represents an alkylene group having 1 to 3 carbon atoms, and n represents an integer of 1 to 7.

In the non-aqueous ink jet composition according to the present invention, the amount of the pigment component is preferably 1.0 mass % or more and 5.0 mass % or less based on the total amount of the non-aqueous ink jet composition; the total amount of the glycol diether and the glycol monoether is preferably 10 mass % or more and 90 mass % or less based on the total amount of the non-aqueous ink jet composition; the organic solvent preferably further contains a cyclic lactone; and the composition preferably further contains a vinyl chloride-based resin.

In addition, the ink jet recording method according to the present invention includes a step of performing recording on a recording medium by an ink jet method using the non-aqueous ink jet composition according to the present invention.

The present inventors have also diligently studied to solve the above-described problems and, as a result, have found that a non-aqueous ink jet composition including a pigment component at least containing a diketopyrrolopyrrole pigment, a prescribed organic solvent, and a specific inorganic metal in an amount within a predetermined range has excellent storage stability and can form recorded matters having excellent intensity, and have accomplished the present invention.

That is, a second aspect of the present invention relates to a non-aqueous ink jet composition including a pigment component containing a diketopyrrolopyrrole pigment, an organic solvent, and an inorganic metal. The organic solvent contains glycol ethers. The inorganic metal includes at least one of alkali metals and alkaline earth metals. The amount of a first inorganic metal of which the amount is the highest among the alkali metals and the alkaline earth metals is 100 mass ppm or less based on the total amount of the non-aqueous ink jet composition. The factors of such a non-aqueous ink jet composition that can solve the above-described problems are presumed, but not limited to, as follows: Known non-aqueous compositions including a pigment component merely containing a diketopyrrolopyrrole pigment do not provide sufficiently excellent intensity to the resulting recorded matter because of occurrence of uneven aggregation in the recorded matter. Against this problem, the occurrence of uneven aggregation can be prevented by using glycol ethers as the organic solvent. However, diketopyrrolopyrrole pigments are contaminated with large amounts of inorganic metals as impurities, compared with other pigments. In addition, the glycol ethers used as the solvent have high affinity with water and thereby readily absorb water. Thus, the ink jet composition readily contains water. These properties cause occurrence of an insoluble crystalline substance from the inorganic metal in the composition, resulting in poor storage stability. In contrast, the non-aqueous composition according to the present invention includes a pigment component containing a diketopyrrolopyrrole pigment, glycol ethers, and the first inorganic metal in an amount of 100 mass ppm or less and thereby can form recorded matters with excellent intensity and have excellent storage stability.

In the non-aqueous ink jet composition according to the present invention, the amount of a second inorganic metal of which the amount comes after that of the first inorganic metal among the alkali metals and the alkaline earth metals is less than 100 mass ppm based on the total amount of the non-aqueous ink jet composition. The first inorganic metal is preferably at least any of sodium, potassium, and calcium. The glycol ethers preferably include a glycol diether represented by Formula (1) and/or a glycol monoether represented by Formula (2):

$$R^1O-(R^3O)_m-R^2 \quad (1)$$

where, $R^1$ and $R^2$ each independently represent an alkyl group having 1 to 7 carbon atoms, $R^3$ represents an alkylene group having 1 to 3 carbon atoms, and m represents an integer of 1 to 7,

$$OH-(R^5O)_n-R^4 \quad (2)$$

where, $R^4$ represents an alkyl group having 1 to 7 carbon atoms, $R^5$ represents an alkylene group having 1 to 3 carbon atoms, and n represents an integer of 1 to 7.

In the non-aqueous ink jet composition according to the present invention, the amount of the pigment component is preferably 1.0 mass % or more and 5.0 mass % or less based on the total amount of the non-aqueous ink jet composition; the amount of the glycol ethers is preferably 10 mass % or more and 90 mass % or less based on the total amount of the non-aqueous ink jet composition; and the organic solvent preferably further contains a cyclic lactone. The non-aqueous ink jet composition preferably further includes a vinyl chloride-based resin.

In addition, the ink jet recording method according to the present invention includes a step of performing recording on a recording medium by an ink jet method using the non-aqueous ink jet composition according to the present invention.

BRIEF DESCRIPTION OF THE DRAWINGS

The invention will be described with reference to the accompanying drawing, wherein like numbers reference like elements.

FIG. 1 is a perspective view schematically illustrating the configuration of a printer according to an embodiment of the present invention.

DESCRIPTION OF EXEMPLARY EMBODIMENTS

A first aspect (hereinafter, referred to as "the embodiment") for implementing the present invention will now be described in detail with reference to the drawing as needed. The following embodiment is exemplification for explaining the present invention and is not intended to limit the present invention to the following contents. The present invention can be implemented by being appropriately modified within the scope of the gist. In the drawing, the same elements are denoted by the same reference signs, and the duplicated explanation is omitted. The positional relation such as up and down and right and left is based on the positional relation shown in the drawing, unless otherwise specified. The dimensional ratio is not limited to that shown in the drawing.

Non-Aqueous Ink Jet Composition

The non-aqueous ink jet composition (hereinafter, also simply referred to as "ink jet composition", "non-aqueous composition", or "composition") of the embodiment includes a pigment component containing a diketopyrrolopyrrole pigment and an organic solvent. In the non-aqueous ink jet composition, the organic solvent contains a glycol ether, and the amount of water is 10 mass % or less based on the total amount (100 mass %) of the non-aqueous ink jet composition.

The composition of the embodiment includes a pigment component containing a diketopyrrolopyrrole pigment and also the glycol ether and includes water in an amount of 10 mass % or less and thereby can provide excellent intensity to the resulting recorded matters and can have excellent storage stability. The factors thereof are presumed (but not limited to) as follows. Although the diketopyrrolopyrrole pigment itself has excellent intensity, non-aqueous ink jet compositions including pigment components merely containing the diketopyrrolopyrrole pigment cause uneven aggregation in the recorded matters, resulting in insufficient intensity of the recorded matters. In order to prevent the uneven aggregation, it is conceivable to use a glycol ether as the organic solvent. However, glycol diethers having high hygroscopic properties and glycol monoethers having particularly high hygroscopic properties are contaminated with a large amount of water as an impurity. In addition, if the non-aqueous ink jet composition including such an organic solvent is left in, for example, the atmospheric air, the composition absorbs water with time. In contrast, the diketopyrrolopyrrole pigment has high hydrophobicity. Accordingly, a non-aqueous ink jet composition containing this pigment relatively readily deteriorates the dispersibility of the pigment by being in contact with water, resulting in poor storage stability. Accordingly, the non-aqueous ink jet composition of the present invention includes both a pigment component containing a diketopyrrolopyrrole pigment and the above-mentioned glycol ether and regulates the amount of water to 10 mass % or less. As a result, the non-aqueous ink jet composition of the present invention prevents uneven aggregation of the diketopyrrolopyrrole pigment to effectively utilize the excellent intensity of the pigment and also maintains the high dispersibility of the pigment to obtain excellent storage stability.

In the embodiment, the term "non-aqueous composition" refers to a composition of which the main solvent is of other than water, such as an organic solvent. Herein, the term "main solvent" indicates that the amount of the solvent in a composition is 50 mass % or more, preferably 70 mass % or more, and more preferably 90 mass % or more based on 100 mass % of the composition. In addition, it is preferable that water is not intentionally added to a composition as a main solvent component in preparation of the composition, and it is preferable that water is inevitably contained in a composition as an impurity.

The amount of water is 10.0 mass % or less, preferably 9.3 mass % or less, more preferably 9.1 mass % or less, more preferably 7.0 mass % or less, and more preferably 5.0 mass % or less based on the total amount (100 mass %) of the non-aqueous composition. The amount is more preferably 3.0 mass % or less, more preferably 2.0 mass % or less, and most preferably 1.0 mass % or less. A non-aqueous composition has excellent storage stability by regulating the water content to 10.0 mass % or less.

In the embodiment, the non-aqueous composition has excellent storage stability by regulating the amount of water to the above-mentioned range based on the total amount (100 mass %) of the non-aqueous composition. The amount of water can also be defined by another criterion. For example, the amount of water can also be defined as an amount based on the total amount of a non-aqueous composition excluding water. In the case of defining the amount of water based on the total amount of non-aqueous composition excluding water, the preferred amount of water is the following range. The amount of water is 10.0 mass % or less, preferably less than 10.0 mass %, more preferably 7.0 mass % or less, and more preferably 5.0 mass % or less based on the total amount (100 mass %) of the non-aqueous composition excluding water. The amount is more preferably 3.0 mass % or less, more preferably 2.0 mass % or less, and most preferably 1.0 mass % or less.

The non-aqueous ink jet composition in the embodiment contains a diketopyrrolopyrrole pigment. The diketopyrrolopyrrole pigment has high hydrophobicity, and a non-aqueous ink jet composition containing this pigment relatively readily deteriorates the dispersibility of the pigment by being in contact with water and readily deteriorates the storage stability. In addition, the degree of the deterioration tends to become significant with the amount of the pigment. However, although the non-aqueous composition of the embodiment contains a diketopyrrolopyrrole pigment, the storage stability of the non-aqueous composition can be improved by restricting the amount of water to 10.0 mass % or less. In a non-aqueous composition containing a glycol diether represented by Formula (1) or a glycol monoether represented by Formula (2) described below as the organic solvent, the composition readily absorbs water. In particular, the composition containing a glycol monoether represented by Formula (2) readily absorbs water. It is therefore necessary to appropriately control the amount of water by the process described below.

The lower limit of the water content is not particularly limited and may be lower than the detection limit. However, the lower limit of the water content is preferably 0.05 mass %, more preferably 0.1 mass %, and most preferably 0.15 mass % from the viewpoint of manufacturability of the non-aqueous composition. A water content of 0.05 mass % or more tends to prevent deterioration of image quality or discharge stability caused by more significant absorption of water due to a slight change in the environment, compared with non-aqueous compositions in an excessively dehydrated state, such as a water content lower than 0.05 mass %. The non-aqueous composition in an excessively dehydrated state absorbs water even by a slight change in the environment to readily increase the amount of water. In continuous printing, a difference in the image qualities, such as color tones and glossiness, may be caused between the first recorded matter and the last recorded matter by easily changing the amount of water and thereby increasing viscosity or changing the discharge amount of a coloring component. In such a case, the high intensity of the recorded matter cannot be effectively utilized. It is therefore preferable that the lower limit of the amount of water is 0.05 mass % or more.

The amount of water in the composition can be controlled by, for example, removing water from each component of the composition, specifically, removing water contaminating the organic solvent; removing water from the composition; or preventing water from contaminating the composition during preparation of the composition. Among these methods, the method removing water contaminating the organic solvent is more specifically performed by purifying the organic solvent by distillation; applying the organic solvent to a semi-permeable membrane that selectively allows water to permeate; or selectively allowing water contaminating the organic solvent to adsorb to a water adsorbent. Among these methods, from the viewpoint of more efficiently and certainly reducing the amount of water, purification by distillation is preferred.

The non-aqueous ink jet composition of the embodiment includes a pigment and an organic solvent described below. Compositions containing solvents are roughly classified into two: a real-solvent (high organic solvent) composition and an eco-solvent (low organic solvent) composition. The eco-solvent composition is a low-odor and human and environment-friendly composition, and the organic solvent contained in the composition does not fall under the category of organic solvents defined by the Industrial Safety and Health Act, does not fall under the categories of Class-1 and Class-2 organic solvents defined by the Ordinance On Prevention of Organic Solvent Poisoning, and does not fall under the category of organic solvents requiring local exhaust ventilation in indoor workplaces defined as the installation environment by the Fire Service Act. Although the non-aqueous composition of the embodiment may contain an organic solvent that can be used in real-solvent compositions or an organic solvent that can be used in eco-solvent compositions, preferred is an organic solvent that can be used in eco-solvent compositions.

The "ink jet composition" in the embodiment can be used in a variety of purposes as a composition to be discharged by an ink jet method, and the purposes are not limited. Specifically, the composition is used, for example, as a composition for inks. The composition of the embodiment will now be described in more detail with a case of being used as an ink composition for ink jet recording (hereinafter, also simply referred to as "ink composition"), which in one embodiment of ink jet compositions, but the composition of the embodiment is not limited thereto.

Pigment

The pigment of the embodiment may contain any pigment as long as a diketopyrrolopyrrole pigment is contained, and may contain only a diketopyrrolopyrrole pigment or may contain a mixture of a diketopyrrolopyrrole pigment and a pigment other than the diketopyrrolopyrrole pigment (hereinafter, also referred to as "other pigment").

The diketopyrrolopyrrole pigment may be any pigment having a diketopyrrolopyrrole skeleton. The diketopyrrolopyrrole skeleton may include a substituent, such as an alkyl group, or may include no substituent (the case that the substituents are all hydrogen atoms). Examples of the diketopyrrolopyrrole pigment include, but not limited to, red organic pigments, such as C.I. Pigment Red 254, C.I. Pigment Red 255, C.I. Pigment Red 264, C.I. Pigment Red 270, and C.I. Pigment Red 272; and orange organic pigments, such as C.I. Pigment Orange 71, C.I. Pigment Orange 73, and C.I. Pigment Orange 81. Among these pigments, from the viewpoint of forming recorded matters having more excellent intensity, preferred are the red organic pigments: C.I. Pigment Red 254, C.I. Pigment Red 255, and C.I. Pigment Red 264; more preferred are C.I. Pigment Red 254 and C.I. Pigment Red 255; and most preferred is C.I. Pigment Red 254. These diketopyrrolopyrrole pigments may be used alone or as a mixture of two or more thereof.

The diketopyrrolopyrrole pigment is preferably a diketopyrrolopyrrole red pigment. The diketopyrrolopyrrole red pigment exhibits a red color and has a diketopyrrolopyrrole skeleton, and examples thereof include diketopyrrolopyrrole red pigments mentioned above as red pigments. Herein, the term "exhibiting a red color" indicates that when the color of a recorded matter formed by applying an ink jet composition to a white recording medium so as to cover the entire surface is measured by colorimetry using Spectrolino (manufactured by GretagMacbeth), the value h in the L*C*h color space of the CIE standard colorimetric system is −30° to 45°, preferably −30° to 32°, more preferably −30° to 30°, and most preferably −30° to 25°.

The amount of the diketopyrrolopyrrole pigment is not particularly limited and is 30 mass % or more and 100 mass % or less, 50 mass % or more and 100 mass % or less, or 70 mass % or more and 100 mass % or less based on the total amount (100 mass %) of the pigment component. The use of a composition containing the diketopyrrolopyrrole pigment in an amount within such a range tends to provide more excellent intensity.

The other pigment may be any pigment other than the diketopyrrolopyrrole pigment and can be, for example, inorganic pigments and organic pigments that are usually contained in known non-aqueous ink compositions. These other pigments may be used alone or as a mixture of two or more thereof.

Examples of the organic pigment include, but not limited to, azo pigments (e.g., azo lake, insoluble azo pigments, condensed azo pigments, and chelate azo pigments), polycyclic pigments (e.g., phthalocyanine pigments, perylene and perylene pigments, anthraquinone pigments, quinacridone pigments, dioxadine pigments, thioindigo pigments, isoindolinone pigments, and quinophthalone pigments), dye lakes (e.g., basic dye lakes and acid dye lakes), nitro pigments, nitroso pigments, aniline black, and daylight fluorescent pigments.

Examples of the inorganic pigment include, but not limited to, carbon black, titanium dioxide, silica, and alumina.

It is also preferred to use a red organic pigment (hereinafter, also referred to as "other red organic pigment") other than the diketopyrrolopyrrole pigment or an orange organic pigment (hereinafter, also referred to as "other orange organic pigment") other than the diketopyrrolopyrrole pigment, as the other pigment, from the viewpoint of discharge stability and abrasion resistance.

Examples of the other red organic pigment include, but not limited to, C.I. Pigment Red 2, C.I. Pigment Red 3, C.I. Pigment Red 5, C.I. Pigment Red 6, C.I. Pigment Red 7, C.I. Pigment Red 15, C.I. Pigment Red 16, C.I. Pigment Red 48:1, C.I. Pigment Red 53:1, C.I. Pigment Red 57:1, C.I. Pigment Red 122, C.I. Pigment Red 123, C.I. Pigment Red 139, C.I. Pigment Red 144, C.I. Pigment Red 149, C.I. Pigment Red 166, C.I. Pigment Red 170, C.I. Pigment Red 177, C.I. Pigment Red 178, C.I. Pigment Red 179, C.I. Pigment Red 194, C.I. Pigment Red 209, C.I. Pigment Red 222, and C.I. Pigment Red 224.

The other orange organic pigment is not particularly limited, and examples thereof include C.I. Pigment Orange 31, C.I. Pigment Orange 43, and C.I. Pigment Orange 64.

The amount of the pigment component is preferably 0.5 mass % or more and 10 mass % or less, more preferably 1.0 mass % or more and 7.0 mass % or less, and most preferably 2.5 mass % or more and 3.0 mass % or less, based on the total amount (100 mass %) of the composition. A pigment component content of 0.5 mass % or more tends to provide more excellent intensity to the resulting recorded matters, and a pigment component content of 10 mass % or less tends to provide more excellent storage stability and discharge stability.

Organic Solvent

The organic solvent of the embodiment is not particularly limited as long as a glycol ether is contained. In particular, the organic solvent containing a glycol diether represented by Formula (1) (hereinafter, also referred to as "specific glycol diether") improves the dispersion stability of the diketopyrrolopyrrole pigment to improve the discharge stability. The organic solvent containing a glycol monoether represented by Formula (2) (hereinafter, also referred to as "specific glycol monoether") improves the wet-spreading property of an ink containing a diketopyrrolopyrrole pigment and tends to provide better intensity.

The organic solvent preferably contains a glycol diether represented by Formula (1) and a glycol monoether represented by Formula (2) and preferably contains the glycol diether represented by Formula (1) in an amount higher than 50 mass % based on the total amount (100 mass %) of the glycol diether represented by Formula (1) and the glycol monoether represented by Formula (2). The non-aqueous composition having such a formulation has good dispersion stability and good discharge stability. In addition, the resulting recorded matters have high abrasion resistance.

$$R^1O-(R^3O)_m-R^2 \quad (1)$$

where, $R^1$ and $R^2$ each independently represent an alkyl group having 1 to 7 carbon atoms, $R^3$ represents an alkylene group having 1 to 3 carbon atoms, and m represents an integer of 1 to 7, $$OH-(R^5O)_n-R^4 \quad (2)$$

where, $R^4$ represents an alkyl group having 1 to 7 carbon atoms, $R^5$ represents an alkylene group having 1 to 3 carbon atoms, and n represents an integer of 1 to 7.

In Formula (1), $R^1$ and $R^2$ each independently preferably represent an alkyl group having 1 to 5 carbon atoms; $R^3$ preferably represents an alkylene group having 2 or 3 carbon atoms; and m preferably represents an integer of 1 to 6. In Formula (2), $R^4$ preferably represents an alkyl group having 1 to 5 carbon atoms; $R^5$ preferably represents an alkylene group having 2 or 3 carbon atoms; and n preferably represents an integer of 1 to 6.

Examples of the specific glycol diether include, but not limited to, ethylene glycol dimethyl ether, ethylene glycol diethyl ether, ethylene glycol dibutyl ether, diethylene glycol dimethyl ether, diethylene glycol diethyl ether, diethylene glycol ethyl methyl ether, diethylene glycol dibutyl ether, triethylene glycol dimethyl ether, triethylene glycol diethyl ether, triethylene glycol dibutyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, and dipropylene glycol diethyl ether. Among these glycol diethers, preferred are diethylene glycol ethyl methyl ether, diethylene glycol diethyl ether, and tetraethylene glycol dimethyl ether; and more preferred is diethylene glycol ethyl methyl ether. The diethylene glycol ethyl methyl ether indicates the same compound as the diethylene glycol methyl ethyl ether used in Examples. The composition containing such a preferred specific glycol diether tends to provide more excellent abrasion resistance to the resulting recorded matters and tends to have more excellent discharge stability. These specific glycol diethers may be used alone or in combination of two or more thereof.

The amount of the specific glycol diether is preferably 5.0 mass % or more and 90 mass % or less, more preferably 20 mass % or more and 80 mass % or less, and most preferably 30 mass % or more and 70 mass % or less based on the total amount (100 mass %) of the composition. The composition containing the specific glycol diether within the above-mentioned range tends to provide more excellent intensity to the resulting recorded matters and have more excellent storage stability. Herein, the amount of the specific glycol diether in the composition is the amount including the amount of the specific glycol diether contained in, for example, a dispersion.

Examples of the specific glycol monoether include, but not limited to, ethylene glycol monomethyl ether, ethylene glycol monoethyl ether, ethylene glycol mono-n-propyl ether, ethylene glycol monoisopropyl ether, ethylene glycol monobutyl ether, ethylene glycol monohexyl ether, ethylene glycol monophenyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether, tetraethylene glycol monomethyl ether, tetraethylene glycol monoethyl ether, tetraethylene glycol monobutyl ether, propylene glycol monomethyl ether, propylene glycol monoethyl ether, dipropylene glycol monomethyl ether, and dipropylene glycol monoethyl ether. Among these glycol monoethers, preferred are ethylene glycol monobutyl ether, triethylene glycol monobutyl ether, tetraethylene glycol monoethyl ether, and dipropylene glycol monoethyl ether; and more preferred is triethylene glycol monobutyl ether. The composition containing such a preferred specific glycol monoether tends to provide more excellent abrasion resistance to the resulting recorded matters and have more excellent discharge stability. These specific glycol monoethers may be used alone or in combination of two or more thereof.

The amount of the specific glycol monoether is preferably 5.0 mass % or more and 80 mass % or less, more preferably 7.0 mass % or more and 60 mass % or less, more preferably 7.0 mass % or more and 40 mass % or less, and most preferably 7.0 mass % or more and 18 mass % or less based on the total amount (100 mass %) of the composition. The composition containing the specific glycol monoether within the above-mentioned range tends to provide more excellent intensity to the resulting recorded matters and have more excellent storage stability. Herein, the amount of the specific glycol monoether in the composition is the amount including the amount of the specific glycol monoether contained in, for example, a dispersion.

The total amount of the specific glycol diether and the specific glycol monoether is preferably 5.0 mass % or more and 95 mass % or less, more preferably 10 mass % or more and 90 mass % or less, and most preferably 20 mass % or more and 85 mass % or less based on the total amount (100 mass %) of the composition. The composition containing the specific glycol diether and the specific glycol monoether within the above-mentioned range tends to provide more excellent intensity to the resulting recorded matters and have more excellent storage stability. Herein, the total amount of the specific glycol diether and the specific glycol monoether in the composition is the amount including the amounts of the specific glycol diether and the specific glycol monoether contained in, for example, a dispersion.

The organic solvent may contain a glycol diether (hereinafter, also referred to as "other glycol diether") other than the specific glycol diether and/or a glycol monoether (hereinafter, also referred to as "other glycol monoether") other than the specific glycol monoether. Examples of the other glycol diether include heptaethylene glycol dimethyl ether. Examples of the other glycol monoether include heptaethylene glycol monomethyl ether.

The organic solvent tends to provide more excellent abrasion resistance to the resulting recorded matters and have more excellent storage stability by further containing a cyclic lactone. The cyclic lactone may be any compound having a ring structure formed by ester bonds, and examples thereof include γ-lactone having a five-membered ring structure, δ-lactone having a six-membered ring structure, and ε-lactone having a seven-membered ring structure. Examples of the cyclic lactone include, but not limited to, γ-butyrolactone, γ-valerolactone, γ-hexalactone, γ-heptalactone, γ-octalactone, γ-nonalactone, γ-decalactone, γ-undecalactone, δ-valerolactone, δ-hexalactone, δ-heptalactone, δ-octalactone, δ-nonalactone, δ-decalactone, δ-undecalactone, and ε-caprolactam. Among these cyclic lactones, preferred are γ-lactone having a five-membered ring structure and δ-lactone having a six-membered ring structure; more preferred are γ-butyrolactone, γ-valerolactone, and δ-valerolactone; and most preferred is γ-butyrolactone. The composition containing such a cyclic lactone tends to provide further enhanced abrasion resistance. The cyclic lactones may be used alone or in combination of two or more thereof.

The amount of the cyclic lactone is preferably 1.0 mass % or more and 50 mass % or less, more preferably 3.0 mass % or more and 40 mass % or less, and most preferably 5.0 mass % or more and 30 mass % or less based on the total amount (100 mass %) of the composition. A cyclic lactone content of 1.0 mass % or more tends to provide more excellent abrasion resistance, and a cyclic lactone content of 50 mass % or less tends to provide more excellent intensity. Herein, the amount of the cyclic lactone in the composition is the amount including the amount of the cyclic lactone contained in, for example, a dispersion.

The organic solvent (other organic solvent) other than the glycol diether, the glycol monoether, and the cyclic lactone is preferably a hydrocarbon solvent, an alcohol solvent, and an ester solvent, and more preferably an ester solvent.

The hydrocarbon solvent is not particularly limited, and examples thereof include aliphatic hydrocarbons (e.g., paraffin and isoparaffin), alicyclic hydrocarbons (e.g., cyclohexane, cyclooctane, and cyclodecane), and aromatic hydrocarbons (e.g., benzene, toluene, xylene, naphthalene, and tetralin). The hydrocarbon solvent may be a commercially available one, and examples thereof include aliphatic hydrocarbon solvents and alicyclic hydrocarbon solvents, such as IP Solvent 1016, IP Solvent 1620, and IP Clean LX (these are all trade names, manufactured by Idemitsu Kosan Co., Ltd.), Isopar G, Isopar L, Isopar H, Isopar M, Exxsol D40, Exxsol D80, Exxsol D100, Exxsol D130, and Exxsol D140 (these are all trade names, manufactured by Exxon), NS Clean 100, NS Clean 110, NS Clean 200, and NS Clean 220 (these are all trade names, manufactured by JX Nippon Oil & Energy Corporation), and Naphtesol 160, Naphtesol 200, and Naphtesol 220 (these are all trade names, manufactured by JX Nippon Oil & Energy Corporation); and aromatic hydrocarbon solvents, such as Solvesso 200 (trade name, manufactured by Exxon).

The alcohol solvent is not particularly limited, and examples thereof include methanol, ethanol, isopropanol, 1-propanol, 1-butanol, 2-butanol, 3-pentanol, 2-methyl-1-butanol, 2-methyl-2-butanol, isoamyl alcohol, 3-methyl-2-butanol, 3-methoxy-3-methyl-1-butanol, 4-methyl-2-pentanol, allyl alcohol, 1-hexanol, 1-heptanol, 2-heptanol, and 3-heptanol.

The ester solvent is not particularly limited, and examples thereof include methyl acetate, ethyl acetate, n-propyl acetate, isopropyl acetate, n-butyl acetate, isobutyl acetate, isopentyl acetate, sec-butyl acetate, amyl acetate, methoxybutyl acetate (3-methoxybutyl acetate, 3-methoxy-3-methyl-1-butyl acetate), methyl lactate, ethyl lactate, butyl lactate, methyl caprylate, methyl caprate, ethylene glycol monomethyl ether acetate, ethylene glycol monoethyl ether acetate, propylene glycol monomethyl ether acetate, propylene glycol monoethyl ether acetate, diethylene glycol monomethyl ether acetate, diethylene glycol monoethyl ether acetate, and diethylene glycol monobutyl ether acetate. Among these ester solvents, preferred are methoxybutyl acetate, methyl caprylate, and methyl caprate.

The total amount of at least one of hydrocarbon solvents, alcohol solvents, and ester solvents as the organic solvent is preferably 30 mass % or more and 80 mass % or less, more preferably 40 mass % or more and 60 mass % or less, and most preferably 45 mass % or more and 55 mass % or less based on the total amount (100 mass %) of the non-aqueous composition. The composition containing these solvents within such a range tends to provide more excellent intensity to the resulting recorded matters and have more excellent storage stability.

The amount of the organic solvent is preferably 35 mass % or more and 95 mass % or less, more preferably 50 mass % or more and 90 mass % or less, and most preferably 60 mass % or more and 90 mass % or less based on the total amount (100 mass %) of the composition. Herein, the amount of the organic solvent in the composition is the amount including the amount of the organic solvent contained in, for example, a dispersion.

Resin

The composition of the embodiment may further include a resin for mainly adjusting the viscosity of the composition. Examples of the resin include, but not limited to, acrylic resins; styrene acrylic resins; rosin-modified resins; phenolic resins; terpene-based resins; polyester resins; polyamide resins; epoxy resins; vinyl chloride-based resins, such as vinyl chloride-vinyl acetate copolymer resins; fiber-based resins, such as cellulose acetate butyrate; and vinyl toluene-α-methyl styrene copolymer resins. Among these resins, preferred are vinyl chloride-based resins; and more preferred are vinyl chloride-vinyl acetate copolymer resins. The composition containing such a resin tends to further enhance the abrasion resistance of the resulting recorded matters. These resins may be used alone or as a mixture of two or more thereof.

The vinyl chloride-based resin is not particularly limited, and examples thereof include copolymer resins of vinyl chloride and one or more selected from the group consisting of vinyl acetate, vinylidene chloride, acryls, maleic acid, and vinyl alcohol. Among these resins, preferred are vinyl chloride-vinyl acetate copolymer resins composed of vinyl chloride and vinyl acetate; and more preferred are vinyl chloride-vinyl acetate copolymer resins having a glass transition temperature of 60° C. or more and 80° C. or less. The acryl may be any compound copolymerizable with vinyl chloride, and examples thereof include acrylic esters, such as methyl acrylate, ethyl acrylate, isopropyl acrylate, n-butyl acrylate, and 2-ethylhexyl acrylate; methacrylic esters, such as methyl methacrylate, ethyl methacrylate, isopropyl methacrylate, n-butyl methacrylate, isobutyl methacrylate, t-butyl methacrylate, cyclohexyl methacrylate, and 2-ethylhexyl methacrylate; carboxyl group-containing monomers, such as acrylic acid, methacrylic acid, maleic acid, fumaric acid, itaconic acid, mono-n-butyl maleate, mono-n-butyl fumarate, and mono-n-butyl itaconate; hydroxy group-containing (meth)acrylates; amide group-containing monomers; glycidyl group-containing monomers; cyano group-containing monomers; hydroxy group-containing allyl compounds; tertiary amino group-containing monomers; and alkoxysilyl group-containing monomers. These acryls may be used alone or in combination of two or more thereof.

The amount of the resin is preferably 0.1 mass % or more and 10 mass % or less, more preferably 0.3 mass % or more and 5.0 mass % or less, and most preferably 0.5 mass % or more and 3.0 mass % or less based on the total amount (100 mass %) of the composition. The composition containing a resin within such a range tends to provide further excellent abrasion resistance.

The composition of the embodiment may further include one or more optional components that can be used in known non-aqueous ink compositions for ink jet, in addition to the above-mentioned components. Examples of the optional component include coloring materials such as a dye, surfactants, dispersants, penetrants, moisturizing agents, dissolution aids, viscosity modifiers, pH adjusters, antioxidants, preservatives, antifungal agents, corrosion inhibitors, chelating agents for capturing metal ions that influence dispersion, other additives, and solvents. These components may be each used alone or in combination.

Ink Jet Recording Method

The ink jet recording method of the embodiment records an image by discharging droplets of the above-described non-aqueous composition and allowing the droplets to adhere to a recording medium, preferably, a low-absorbent recording medium.

In the present specification, the term "low-absorbent recording medium" refers to a recording medium that absorbs 10 mL/m$^2$ or less of water within 30 msec$^{1/2}$ from the start of contact with water when measured by a Bristow method. Such a property may be possessed by at least the recording surface. In this definition, examples of the "low-absorbent recording medium" in the present invention include non-absorbent recording media that do not absorb water at all. The Bristow method is most commonly used as a method for measuring the amount of liquid absorbed in a short period of time and is also employed by Japan Technical Association of the Pulp and Paper Industry (JAPAN TAPPI). The details of the test method are described in Standard No. 51 "Paper and Paperboard—Liquid Absorption Test Method—Bristow Method" in "JAPAN TAPPI Paper and Pulp Test Methods, 2000 Edition".

Examples of the low-absorbent recording medium include sheets, films, and fiber products containing low-absorbent materials. The low-absorbent recording medium may be composed of a base material (for example, paper, fiber, leather, plastic, glass, ceramics, or a metal) and a layer containing a low-absorbent material (hereinafter, also referred to as "low-absorbent layer") disposed on the surface of the base material. Examples of the low-absorbent material include, but not limited to, olefin-based resins, ester-based resins, urethane-based resins, acrylic-based resins, and vinyl chloride-based resins.

Among these media, a medium having a recording surface containing a vinyl chloride-based resin can be preferably used as the low-absorbent recording medium. Examples of the vinyl chloride-based resin include poly(vinyl chloride), vinyl chloride-ethylene copolymers, vinyl chloride-vinyl acetate copolymers, vinyl chloride-vinyl ether copolymers, vinyl chloride-vinylidene chloride copolymers, vinyl chloride-maleate copolymers, vinyl chloride-(meth)acrylic acid copolymers, vinyl chloride-(meth)acrylate copolymers, and vinyl chloride-urethane copolymers. The characteristics, such as thickness, shape, color, softening temperature, and hardness, of the low-absorbent recording medium are not particularly limited.

The non-aqueous composition of the embodiment having the above-described formulation can show advantageous effects, excellent intensity and abrasion resistance, against, in particular, a low-absorbent recording medium, specifically, a recording medium containing a vinyl chloride-based resin. Accordingly, the ink jet recording method according to the embodiment can record images having further excellent intensity and abrasion resistance by allowing droplets of the non-aqueous composition to adhere to, in particular, a low-absorbent recording medium, specifically, a recording medium containing a vinyl chloride-based resin.

The ink jet recording method of the embodiment may be performed with any ink jet recording apparatus, and a drop-on-demand ink jet recording apparatus is preferred. Examples of the drop-on-demand ink jet recording apparatus include those employing a piezoelectric element recording method using piezoelectric elements disposed in recording heads and those employing a heat jet recording method using heat energy generated by, for example, heaters of heat-generating resistor elements disposed in recording heads. Any recording method can be employed for the ink jet recording apparatus. An example of the ink jet recording apparatus of the embodiment will now be described in more detail.

Ink Jet Recording Apparatus

The ink jet recording apparatus of the embodiment can use a known ink jet printer. For example, the ink jet printer (hereinafter, also simply referred to as "printer") shown in FIG. 1 can be used.

FIG. 1 is a perspective view illustrating the configuration of a printer 1 in the embodiment. As shown in FIG. 1, the printer 1 includes a carriage 4 on which an ink jet recording head 2 is mounted and an ink cartridge 3 is detachably installed; a platen 5 disposed below the ink jet recording head (ink jet head) 2 and onto which a recording medium 6 is transported; a carriage-moving mechanism 7 for moving the carriage 4 in the medium width direction (main scanning direction S) of the recording medium 6; and a medium-transporting mechanism 8 for transporting the recording medium 6 in the medium-transporting direction. The printer 1 also has a controller CONT that controls the entire operation of the printer 1.

The recording head 2 includes cavities for discharging the non-aqueous composition accommodated therein from nozzles; discharge-driving portions provided to the corresponding cavities and applying driving force for discharge to the non-aqueous composition; and nozzles provided to the corresponding cavities and discharging the non-aqueous composition to the outside of the head. One head may be provided with a plurality of independent cavities and the discharge-driving portions and nozzles provided to the corresponding cavities. The discharge-driving portion can be formed using, for example, an electromechanical transducer, such as a piezoelectric element, that changes the volume of the cavity by mechanical deformation, or an electrothermal transducer that generates heat to form air bubbles in the non-aqueous composition and thereby discharges the non-aqueous composition. The printer 1 may include one head for one non-aqueous composition or may include a plurality of heads for one non-aqueous composition.

The ink cartridge 3 is composed of a plurality of independent cartridges, and each cartridge is filled with the non-aqueous composition. The cartridge filled with the non-aqueous composition may be removed from the carriage 4 during ordinary printing, but should be installed on the carriage 4 at least when the flow channel of the non-aqueous composition is rinsed.

The platen 5 includes a platen heater and is configured so as to heat the recording medium to a preset temperature. The recording head 2 does not have a built-in heater, but the temperature of the recording head is also increased as a result of heating of the recording medium, and thereby the temperature of the non-aqueous composition accommodated in the recording head 2 tends to raise. The printer 1 may include an after-heater (not shown) in the recording medium-transporting path downstream of the platen heater.

The above-described non-aqueous composition of the embodiment is discharged from the recording head 2. Herein, the temperature of the platen when the non-aqueous composition is discharged from the recording head 2 is preferably 35° C. or more and more preferably 40° C. or more, and is preferably 80° C. or less, more preferably 70° C. or less, more preferably 60° C. or less, and most preferably 50° C. or less. The platen heated with a platen heater to a temperature within the above-mentioned range is advantageous to provide higher quality to recorded matters.

In addition, in the embodiment, the frequency of discharge from the recording head 2 is preferably 1.0 kHz or more and 200 kHz or less. A discharge frequency lower than the upper limit of the above-mentioned range is preferred from the point of providing more excellent discharge stability, and a discharge frequency higher than the lower limit of the above-mentioned range is preferred from the point of providing a higher recording speed. The term "discharge frequency" indicates the frequency of discharging each non-aqueous composition droplet as a discharge unit. The discharge frequency is preferably 2.0 kHz or more, more preferably 3.0 kHz or more, more preferably 5.0 kHz or more, and most preferably 10 kHz or more from the viewpoint of further accelerating the recording speed. In addition, the discharge frequency is preferably 200 kHz or less, more preferably 150 kHz or less, more preferably 100 kHz or less, and most preferably 50 kHz or less from the viewpoint of enhancing the discharge stability. Furthermore, the discharge frequency is preferably 20 kHz or less and more preferably 15 kHz or less from the point of providing further excellent discharge stability while maintaining the recording speed. At the same time, the discharge frequency is preferably 15 kHz or more and more preferably 20 kHz or more from the point of providing higher recording speed while maintaining the discharge stability.

As an example of the printer 1 of the embodiment, a so-called on-carriage type printer having the ink cartridge mounted on the carriage 4 was described above, but the printer is not limited thereto. For example, the printer may be of a so-called off-carriage type, where an ink container (such as an ink pack or ink cartridge) filled with the non-aqueous composition is installed on, for example, the housing of the printer 1 and the non-aqueous composition is supplied to the head 2 through an ink supply tube.

The ink jet recording apparatus of the embodiment can employ an ink set including a plurality of non-aqueous compositions. The ink set of the embodiment may include a plurality of the non-aqueous ink jet compositions of the embodiment and may further include one or more non-aqueous compositions (other non-aqueous composition(s)) different from the non-aqueous ink jet compositions of the embodiment. In such a case, the ink set may include a magenta ink of the non-aqueous composition of the embodiment and a yellow ink and a cyan ink of the other non-aqueous compositions. Alternatively, the ink set may include a red ink of the non-aqueous composition of the embodiment and a magenta ink, a yellow ink, and a cyan ink of the other non-aqueous compositions. From the viewpoint of achieving more excellent color reproducibility, the non-aqueous composition of the embodiment is preferably used as a red ink and is preferably used together with magenta, yellow, and cyan inks of the other non-aqueous compositions.

A second aspect (hereinafter, referred to as "the embodiment") for implementing the present invention will now be described in detail with reference to the drawing as needed. The following embodiment is exemplification for explaining the present invention and is not intended to limit the present invention to the following contents. The present invention can be implemented by being appropriately modified within the scope of the gist. In the drawing, the same elements are denoted by the same reference signs, and the duplicated explanation is omitted. The positional relation such as up and down and right and left is based on the positional relation shown in the drawing, unless otherwise specified. The dimensional ratios are not limited to those shown in the drawing.

Non-Aqueous Ink Jet Composition

The non-aqueous ink jet composition (hereinafter, also simply referred to as "ink jet composition", "non-aqueous composition", or "composition") of the embodiment includes a pigment component containing a diketopyrrolopyrrole pigment, an organic solvent, and inorganic metal. In the non-aqueous ink jet composition, the organic solvent contains glycol ethers. The inorganic metal includes at least one of alkali metals and alkaline earth metals. The amount of a first inorganic metal of which the amount is the highest among the alkali metals and the alkaline earth metals is 100 mass ppm or less based on the total amount of the non-aqueous ink jet composition.

The composition of the embodiment includes a pigment component containing a diketopyrrolopyrrole pigment and also the glycol ethers and includes the first inorganic metal in an amount of 100 mass ppm or less and thereby can provide excellent intensity to the resulting recorded matters and can have excellent storage stability. The factors thereof are presumed (but not limited to) as follows. Known non-aqueous ink jet compositions including pigment components merely containing the diketopyrrolopyrrole pigment cause uneven aggregation in the recorded matters, resulting in insufficient intensity of the recorded matters. Against this problem, the occurrence of uneven aggregation can be prevented by using glycol ethers as the organic solvent. However, diketopyrrolopyrrole pigments are contaminated with large amounts of inorganic metals as impurities, compared with other pigments. In addition, the glycol ethers used as the solvent have high affinity with water and thereby readily absorb water. Thus, the ink jet composition readily contains water. These properties cause occurrence of an insoluble crystalline substance from the inorganic metal, resulting in poor storage stability. In contrast, the non-aqueous composition of the embodiment includes a pigment component containing a diketopyrrolopyrrole pigment, glycol ethers, and the first inorganic metal in an amount of 100 mass ppm or less and thereby can provide excellent intensity to the resulting recorded matters and have excellent storage stability.

In the embodiment, the term "non-aqueous composition" refers to a composition of which the main solvent is of other than water, such as an organic solvent. Herein, the term "main solvent" indicates that the amount of the solvent in a composition is 50 mass % or more, preferably 70 mass % or more, and more preferably 90 mass % or more based on 100 mass % of the composition. In addition, it is preferable that water is not intentionally added to a composition as a main solvent component in preparation of the composition, and it is preferable that water is inevitably contained in a composition as an impurity. The amount of water in the composition is preferably 3.0 mass % or less, more preferably 2.0 mass % or less, more preferably 1.0 mass % or less, and most preferably 0.5 mass % or less based on 100 mass % of the composition from the viewpoint of storage stability. The lower limit of the water content is not particularly limited and may be lower than the detection limit or may be 0.01 mass %.

Inorganic Metal

The inorganic metal of the embodiment contains at least one of alkali metals and alkaline earth metals. The inorganic metal is, for example, contained in each raw material included in the non-aqueous composition as impurities, and is particularly included in the pigment component. Examples of the inorganic metal include alkali metals, such as lithium (Li), sodium (Na), and potassium (K); alkaline earth metals, such as calcium (Ca) and barium (Ba); gold (Ag); magnesium (Mg); zinc (Zn); iron (Fe); tin (Sn); and zirconium (Zr). Herein, in the present specification, the term "inorganic metal" refers to metal elements that exist in a form other than organic metal compounds in the non-aqueous composition. The inorganic metal in the non-aqueous composition may exist in any form of a neutral metal, metal ion, and metal salt, but an inorganic metal existing in a metal ion or metal salt form may disadvantageously affect the storage stability or discharge stability. The composition of the embodiment can reduce such influence to improve the storage stability and the discharge stability. Herein, among the alkali metals and the alkaline earth metals, the metal (species) in a largest amount in the non-aqueous composition is referred as a first inorganic metal, the metal (species) in a second largest amount is referred to as a second inorganic metal, and a metal (species) in a third largest amount is referred to as a third inorganic metal. The first inorganic metal, the second inorganic metal, and the third inorganic metal are each not limited to one species and each may include a plurality of metals in approximately the same amounts (in mass basis, within a difference of 5 mass % or less). The metal (species) in a large amount varies depending on the pigment contained in the non-aqueous composition, the process of producing the composition, the container in contact with the non-aqueous composition, and the method of controlling the amount of the inorganic metal. For example, diketopyrrolopyrrole pigments tend to be contaminated with a large amount of inorganic metals as impurities, compared with other pigments. The non-aqueous composition inevitably contains a significantly small amount of water. It is presumed that the inorganic metal brought into contact with water generates insoluble crystalline substance, resulting in deterioration of the storage stability (however, the factors are not limited thereto). In addition, diketopyrrolopyrrole pigments are contaminated with a large amount of inorganic metals in many cases, and known non-aqueous compositions containing diketopyrrolopyrrole pigments readily decrease the storage stability. In addition, the glycol ethers used as solvent have high affinity with water and thereby readily absorb water. Known non-aqueous compositions containing glycol ethers therefore readily contain water. In non-aqueous compositions containing a large amount of inorganic metals due to the diketopyrrolopyrrole pigments and containing glycol ethers having high affinity with water as solvents, in order to prevent occurrence of foreign substances, the first inorganic metal content is restricted to 100 mass ppm or less in the embodiment.

The first inorganic metal is preferably at least any one of sodium, potassium, and calcium from the viewpoint of certainly achieving the advantageous effects of the present invention. For example, in the cases using diketopyrrolopyrrole pigments, sodium tends to be the first inorganic metal; sodium tends to be the first inorganic metal, and potassium or calcium tends to be the second inorganic metal; and sodium tends to be the first inorganic metal, potassium tends to be the second inorganic metal, and calcium tends to be the third inorganic metal. When the first inorganic metal is an alkali metal, the advantageous effects of the present invention tend to be more certainly achieved. When the first inorganic metal is sodium, the advantageous effects of the present invention tend to be further certainly achieved.

The amount of the first inorganic metal is 100 mass ppm or less, preferably 0.1 mass ppm or more and 100 mass ppm or less, more preferably 0.5 mass ppm or more and 70 mass ppm or less, more preferably 1.0 mass ppm or more and 50 mass ppm or less, more preferably 2.0 mass ppm or more and 30 mass ppm or less, and most preferably 3.0 mass ppm or more and 10 mass ppm or less based on the total amount of the non-aqueous composition. The non-aqueous composition containing the first inorganic metal in an amount of 100 mass ppm or less has excellent storage stability. The non-aqueous composition containing the first inorganic metal in an amount of 0.1 mass ppm or more can appropriately reduce occurrence of mist and can further reduce the procedures, such as purification, for controlling the amount of the inorganic metals in the non-aqueous composition, leading to excellent manufacturability. A first organic metal content of 0.1 mass ppm or more can appropriately reduce occurrence of mist and thereby maintain good cleanliness of the nozzle plate, leading to maintenance of good discharge stability.

The amount of the second inorganic metal is preferably less than 100 mass ppm, more preferably 0.1 mass ppm or more and less than 100 mass ppm, more preferably 0.5 mass ppm or more and 70 mass ppm or less, more preferably 1.0 mass ppm or more and 50 mass ppm or less, more preferably 2.0 mass ppm or more and 30 mass ppm or less, and most preferably 3.0 mass ppm or more and 10 mass ppm or less based on the total amount of the non-aqueous composition. The non-aqueous composition containing the second inorganic metal in an amount of less than 100 mass ppm has more excellent storage stability. A second inorganic metal content of 0.1 mass ppm or more provides more excellent intensity to the resulting recorded matters and leads to more excellent manufacturability of the non-aqueous composition. A second inorganic metal content of 0.1 mass ppm or more improves the wet-spreading property of the recorded matters formed from the non-aqueous composition, tending to provide more excellent intensity.

The amount of the third inorganic metal is preferably less than 100 mass ppm, more preferably 0.1 mass ppm or more and less than 100 mass ppm, more preferably 0.5 mass ppm or more and 70 mass ppm or less, more preferably 1.0 mass ppm or more and 50 mass ppm or less, more preferably 2.0 mass ppm or more and 30 mass ppm or less, and most preferably 3.0 mass ppm or more and 10 mass ppm or less based on the total amount of the non-aqueous composition. The non-aqueous composition containing the third inorganic metal in an amount of less than 100 mass ppm has more excellent storage stability. A third inorganic metal content of 0.1 mass ppm or more provides more excellent intensity to the resulting recorded matters and leads to more excellent manufacturability of the non-aqueous composition. A third inorganic metal content of 0.1 mass ppm or more improves the wet-spreading property of the recorded matters formed from the non-aqueous composition, tending to provide more excellent intensity.

Examples of the method of controlling the amount of inorganic metals in the composition include a method involving purification of a pigment to control the amount of inorganic metals contained in the pigment; a method involving selection of the material of the container in contact with the composition; and a method involving purification of the composition. The amount of inorganic metals can be measured by a method described in Examples below.

The non-aqueous ink jet composition of the embodiment includes a pigment and an organic solvent described below. Compositions containing solvents are roughly classified into two: a real-solvent (high organic solvent) composition and an eco-solvent (low organic solvent) composition. The eco-solvent composition is a low-odor and human and environment-friendly composition, and the organic solvent contained in the composition does not fall under the category of organic solvents defined by the Industrial Safety and Health Act, does not fall under the categories of Class-1 and Class-2 organic solvents defined by the Ordinance On Prevention of Organic Solvent Poisoning, and does not fall under the category of organic solvents requiring local exhaust ventilation in indoor workplaces defined as the installation environment by the Fire Service Act. Although the non-aqueous composition of the embodiment may contain an organic solvent that can be used in real-solvent compositions or an organic solvent that can be used in eco-solvent compositions, preferred is an organic solvent that can be used in eco-solvent compositions.

The "ink jet composition" in the embodiment can be used in a variety of purposes as a composition to be discharged by an ink jet method, and the purposes are not limited. Specifically, the composition is used, for example, as a composition for inks. The composition of the embodiment will now be described in more detail with a case of being used as an ink composition for ink jet recording (hereinafter, also simply referred to as "ink composition"), which in one embodiment of ink jet compositions, but the composition of the embodiment is not limited thereto.

Pigment

The pigment component of the embodiment may contain any pigment as long as a diketopyrrolopyrrole pigment is contained, and may contain only a diketopyrrolopyrrole pigment or may contain a mixture of a diketopyrrolopyrrole pigment and a pigment other than the diketopyrrolopyrrole pigment (hereinafter, also referred to as "other pigment").

The diketopyrrolopyrrole pigment may be any pigment having a diketopyrrolopyrrole skeleton. The diketopyrrolopyrrole skeleton may include a substituent, such as an alkyl group, or may include no substituent (the case that the substituents are all hydrogen atoms). Examples of the diketopyrrolopyrrole pigment include, but not limited to, red organic pigments, such as C.I. Pigment Red 254, C.I. Pigment Red 255, C.I. Pigment Red 264, C.I. Pigment Red 270, and C.I. Pigment Red 272; and orange organic pigments, such as C.I. Pigment Orange 71, C.I. Pigment Orange 73, and C.I. Pigment Orange 81. Among these pigments, from the viewpoint of forming recorded matters having more excellent intensity, preferred are the red organic pigments C.I. Pigment Red 254, C.I. Pigment Red 255, and C.I. Pigment Red 264; more preferred are C.I. Pigment Red 254 and C.I. Pigment Red 255; and most preferred is C.I. Pigment Red 254. These diketopyrrolopyrrole pigments may be used alone or as a mixture of two or more thereof.

The diketopyrrolopyrrole pigment is preferably a diketopyrrolopyrrole red pigment. The diketopyrrolopyrrole red pigment exhibits a red color and has a diketopyrrolopyrrole skeleton, and examples thereof include diketopyrrolopyrrole red pigments mentioned above as red pigments. Herein, the term "exhibiting a red color" indicates that when the color of a recorded matter formed by applying an ink jet composition to a white recording medium so as to cover the entire surface is measured by colorimetry using Spectrolino (manufactured by GretagMacbeth), the value h in the L*C*h color space of the CIE standard colorimetric system is −30° to 45°, preferably −30° to 32°, more preferably −30° to 30°, and most preferably −30° to 25°.

The amount of the diketopyrrolopyrrole pigment is not particularly limited and is 30 mass % or more and 100 mass % or less, 50 mass % or more and 100 mass % or less, or 70 mass % or more and 100 mass % or less based on the total amount (100 mass %) of the pigment component. The use of a composition containing the diketopyrrolopyrrole pigment in an amount within such a range tends to provide more excellent intensity.

The other pigment may be any pigment other than the diketopyrrolopyrrole pigment and can be, for example, inorganic pigments and organic pigments that are usually contained in known non-aqueous ink compositions. These other pigments may be used alone or as a mixture of two or more thereof.

Examples of the organic pigment include, but not limited to, azo pigments (e.g., azo lake, insoluble azo pigments, condensed azo pigments, and chelate azo pigments), polycyclic pigments (e.g., phthalocyanine pigments, perylene and perylene pigments, anthraquinone pigments, quinacridone pigments, dioxadine pigments, thioindigo pigments, isoindolinone pigments, and quinophthalone pigments), dye lakes (e.g., basic dye lakes and acid dye lakes), nitro pigments, nitroso pigments, aniline black, and daylight fluorescent pigments.

Examples of the inorganic pigment include, but not limited to, carbon black, titanium dioxide, silica, and alumina.

It is also preferred to use a red organic pigment (hereinafter, also referred to as "other red organic pigment") other than the diketopyrrolopyrrole pigment or an orange organic pigment (hereinafter, also referred to as "other orange organic pigment") other than the diketopyrrolopyrrole pigment, as the other pigment, from the viewpoint of discharge stability and abrasion resistance.

Examples of the other red organic pigment include, but not limited to, C.I. Pigment Red 2, C.I. Pigment Red 3, C.I. Pigment Red 5, C.I. Pigment Red 6, C.I. Pigment Red 7, C.I. Pigment Red 15, C.I. Pigment Red 16, C.I. Pigment Red 48:1, C.I. Pigment Red 53:1, C.I. Pigment Red 57:1, C.I. Pigment Red 122, C.I. Pigment Red 123, C.I. Pigment Red 139, C.I. Pigment Red 144, C.I. Pigment Red 149, C.I. Pigment Red 166, C.I. Pigment Red 170, C.I. Pigment Red 177, C.I. Pigment Red 178, C.I. Pigment Red 179, C.I. Pigment Red 194, C.I. Pigment Red 209, C.I. Pigment Red 222, and C.I. Pigment Red 224.

The other orange organic pigment is not particularly limited, and examples thereof include C.I. Pigment Orange 31, C.I. Pigment Orange 43, and C.I. Pigment Orange 64.

The amount of the pigment component is preferably 0.5 mass % or more and 10 mass % or less, more preferably 1.0 mass % or more and 7.0 mass % or less, and most preferably 2.5 mass % or more and 3.0 mass % or less, based on the total amount (100 mass %) of the composition. A pigment component content of 0.5 mass % or more tends to provide more excellent intensity to the resulting recorded matters, and a pigment component content of 10 mass % or less tends to provide more excellent storage stability and discharge stability.

Organic Solvent

The organic solvent of the embodiment is not particularly limited as long as glycol ethers are contained. The composition can prevent occurrence of uneven aggregation by containing glycol ethers, can further improve intensity by using a diketopyrrolopyrrole pigment, and can prevent occurrence of uneven aggregation by containing glycol ethers as the organic solvent.

The glycol ethers preferably include a glycol diether represented by Formula (1) (hereinafter, also referred to as "specific glycol diether") from the viewpoint of providing recorded matters having more excellent abrasion resistance and improving the dispersion stability of the diketopyrrolopyrrole pigment. The organic solvent preferably contains a glycol monoether represented by Formula (2) (hereinafter, also referred to as "specific glycol monoether") from the viewpoint of further improving the wet-spreading property of an ink containing a diketopyrrolopyrrole pigment and providing recorded matters having more excellent intensity. The glycol ethers more preferably include both the specific glycol diether and the specific glycol monoether.

$$R^1O-(R^3O)_m-R^2 \quad (1)$$

where, $R^1$ and $R^2$ each independently represent an alkyl group having 1 to 7 carbon atoms, $R^3$ represents an alkylene group having 1 to 3 carbon atoms, and m represents an integer of 1 to 7, $$OH\text{---}(R^5O)_n\text{---}R^4 \qquad (2)$$

where, $R^4$ represents an alkyl group having 1 to 7 carbon atoms, $R^5$ represents an alkylene group having 1 to 3 carbon atoms, and n represents an integer of 1 to 7.

Examples of the specific glycol diether include, but not limited to, ethylene glycol dimethyl ether, ethylene glycol diethyl ether, ethylene glycol dibutyl ether, diethylene glycol dimethyl ether, diethylene glycol diethyl ether, diethylene glycol ethyl methyl ether, diethylene glycol dibutyl ether, triethylene glycol dimethyl ether, triethylene glycol diethyl ether, triethylene glycol dibutyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, and dipropylene glycol diethyl ether. Among these glycol diethers, preferred are diethylene glycol ethyl methyl ether, diethylene glycol diethyl ether, and tetraethylene glycol dimethyl ether; and more preferred is diethylene glycol ethyl methyl ether. The composition containing such a preferred specific glycol diether tends to provide more excellent abrasion resistance to the resulting recorded matters and tends to have more excellent discharge stability. These specific glycol diethers may be used alone or in combination of two or more thereof.

The amount of the specific glycol diether is preferably 5.0 mass % or more and 90 mass % or less, more preferably 20 mass % or more and 80 mass % or less, and most preferably 30 mass % or more and 70 mass % or less based on the total amount (100 mass %) of the composition. The composition containing the specific glycol diether within the above-mentioned range tends to provide more excellent intensity to the resulting recorded matters and have more excellent storage stability. In addition, the non-aqueous composition tends not to be contaminated with water. Herein, the amount of the specific glycol diether in the composition is the amount including the amount of the specific glycol diether contained in, for example, a dispersion.

Examples of the specific glycol monoether include, but not limited to, ethylene glycol monomethyl ether, ethylene glycol monoethyl ether, ethylene glycol mono-n-propyl ether, ethylene glycol monoisopropyl ether, ethylene glycol monobutyl ether, ethylene glycol monohexyl ether, ethylene glycol monophenyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether, tetraethylene glycol monomethyl ether, tetraethylene glycol monoethyl ether, tetraethylene glycol monobutyl ether, propylene glycol monomethyl ether, propylene glycol monoethyl ether, dipropylene glycol monomethyl ether, and dipropylene glycol monoethyl ether. Among these glycol monoethers, preferred are ethylene glycol monobutyl ether, triethylene glycol monobutyl ether, tetraethylene glycol monoethyl ether, and dipropylene glycol monoethyl ether; and more preferred is triethylene glycol monobutyl ether. The composition containing such a preferred specific glycol monoether tends to provide more excellent abrasion resistance to the resulting recorded matters and have more excellent discharge stability. These specific glycol monoethers may be used alone or in combination of two or more thereof.

The amount of the specific glycol monoether is preferably 3.0 mass % or more and 80 mass % or less, more preferably 5.0 mass % or more and 30 mass % or less, and most preferably 7.0 mass % or more and 15 mass % or less based on the total amount (100 mass %) of the composition. The composition containing the specific glycol monoether within the above-mentioned range tends to provide more excellent intensity to the resulting recorded matters and have more excellent storage stability. In addition, the non-aqueous composition tends not to be contaminated with water. Herein, the amount of the specific glycol monoether in the composition is the amount including the amount of the specific glycol monoether contained in, for example, a dispersion.

The amount of the glycol ethers is preferably 5.0 mass % or more and 95 mass % or less, more preferably 10 mass % or more and 90 mass % or less, and most preferably 20 mass % or more and 85 mass % or less based on the total amount (100 mass %) of the composition. The composition containing the glycol ethers within the above-mentioned range tends to provide more excellent intensity to the resulting recorded matters and have more excellent discharge stability. In addition, such a specific glycol ether content tends to prevent the non-aqueous composition from being contaminated with water. Herein, the amount of the glycol ethers in the composition is the amount including the amount of the glycol ethers contained in, for example, a dispersion.

The organic solvent may further contain a glycol diether (hereinafter, also referred to as "other glycol diether") other than the specific glycol diether and/or a glycol monoether (hereinafter, also referred to as "other glycol monoether") other than the specific glycol monoether. Examples of the other glycol diether include heptaethylene glycol dimethyl ether. Examples of the other glycol monoether include heptaethylene glycol monomethyl ether.

The organic solvent further containing a cyclic lactone tends to provide more excellent abrasion resistance to the resulting recorded matters and have more excellent storage stability. The cyclic lactone may be any compound having a ring structure formed by ester bonds, and examples thereof include γ-lactone having a five-membered ring structure, δ-lactone having a six-membered ring structure, and ε-lactone having a seven-membered ring structure. Examples of the cyclic lactone include, but not limited to, γ-butyrolactone, γ-valerolactone, γ-hexalactone, γ-heptalactone, γ-octalactone, γ-nonalactone, γ-decalactone, γ-undecalactone, δ-valerolactone, δ-hexalactone, δ-heptalactone, δ-octalactone, δ-nonalactone, δ-decalactone, δ-undecalactone, and ε-caprolactam. Among these cyclic lactones, preferred are γ-lactone having a five-membered ring structure and δ-lactone having a six-membered ring structure; more preferred are γ-butyrolactone, γ-valerolactone, and δ-valerolactone; and most preferred is γ-butyrolactone. The composition containing such a cyclic lactone tends to provide further enhanced abrasion resistance. The cyclic lactones may be used alone or in combination of two or more thereof.

The amount of the cyclic lactone is preferably 1.0 mass % or more and 50 mass % or less, more preferably 3.0 mass % or more and 40 mass % or less, and most preferably 5.0 mass % or more and 30 mass % or less based on the total amount (100 mass %) of the composition. A cyclic lactone content of 1.0 mass % or more tends to provide more excellent abrasion resistance, and a cyclic lactone content of 50 mass % or less tends to provide more excellent intensity. Herein, the amount of the cyclic lactone in the composition is the amount including the amount of the cyclic lactone contained in, for example, a dispersion.

Preferred examples of the organic solvent (other organic solvent) other than the glycol diether, the glycol monoether, and the cyclic lactone are hydrocarbon solvents, alcohol solvents, and ester solvents, and ester solvents are more preferred.

The hydrocarbon solvent is not particularly limited, and examples thereof include aliphatic hydrocarbons (e.g., paraffin and isoparaffin), alicyclic hydrocarbons (e.g., cyclohexane, cyclooctane, and cyclodecane), and aromatic hydrocarbons (e.g., benzene, toluene, xylene, naphthalene, and tetralin). The hydrocarbon solvent may be a commercially available one, and examples thereof include aliphatic hydrocarbon solvents and alicyclic hydrocarbon solvents, such as IP Solvent 1016, IP Solvent 1620, and IP Clean LX (these are all trade names, manufactured by Idemitsu Kosan Co., Ltd.), Isopar G, Isopar L, Isopar H, Isopar M, Exxsol D40, Exxsol D80, Exxsol D100, Exxsol D130, and Exxsol D140 (these are all trade names, manufactured by Exxon), NS Clean 100, NS Clean 110, NS Clean 200, and NS Clean 220 (these are all trade names, manufactured by JX Nippon Oil & Energy Corporation), and Naphtesol 160, Naphtesol 200, and Naphtesol 220 (these are all trade names, manufactured by JX Nippon Oil & Energy Corporation); and aromatic hydrocarbon solvents, such as Solvesso 200 (trade name, manufactured by Exxon).

The alcohol solvent is not particularly limited, and examples thereof include methanol, ethanol, isopropanol, 1-propanol, 1-butanol, 2-butanol, 3-pentanol, 2-methyl-1-butanol, 2-methyl-2-butanol, isoamyl alcohol, 3-methyl-2-butanol, 3-methoxy-3-methyl-1-butanol, 4-methyl-2-pentanol, allyl alcohol, 1-hexanol, 1-heptanol, 2-heptanol, and 3-heptanol.

The ester solvent is not particularly limited, and examples thereof include methyl acetate, ethyl acetate, n-propyl acetate, isopropyl acetate, n-butyl acetate, isobutyl acetate, isopentyl acetate, sec-butyl acetate, amyl acetate, methoxybutyl acetate (3-methoxybutyl acetate, 3-methoxy-3-methyl-1-butyl acetate), methyl lactate, ethyl lactate, butyl lactate, methyl caprylate, methyl caprate, ethylene glycol monomethyl ether acetate, ethylene glycol monoethyl ether acetate, propylene glycol monomethyl ether acetate, propylene glycol monoethyl ether acetate, diethylene glycol monomethyl ether acetate, diethylene glycol monoethyl ether acetate, and diethylene glycol monobutyl ether acetate. Among these ester solvents, preferred are methoxybutyl acetate, methyl caprylate, and methyl caprate.

The total amount of at least one of the hydrocarbon solvents, the alcohol solvents, and ester solvents as the organic solvent is preferably 30 mass % or more and 80 mass % or less, more preferably 40 mass % or more and 60 mass % or less, and most preferably 45 mass % or more and 55 mass % or less based on the total amount (100 mass %) of the non-aqueous composition. The composition containing these solvents within such a range tends to provide more excellent intensity to the resulting recorded matters and have more excellent storage stability.

The amount of the organic solvent is preferably 35 mass % or more and 95 mass % or less, more preferably 50 mass % or more and 90 mass % or less, and most preferably 60 mass % or more and 90 mass % or less based on the total amount (100 mass %) of the composition. Herein, the amount of the organic solvent in the composition is the amount including the amount of the organic solvent contained in, for example, a dispersion.

Resin

The composition of the embodiment may further includes a resin for adjusting the viscosity of the composition. Examples of the resin include, but not limited to, acrylic resins; styrene acrylic resins; rosin-modified resins; phenolic resins; terpene-based resins; polyester resins; polyamide resins; epoxy resins; vinyl chloride-based resins; fiber-based resins, such as cellulose acetate butyrate; and vinyl toluene-α-methyl styrene copolymer resins. Among these resins, preferred are vinyl chloride-based resins; and more preferred are vinyl chloride-vinyl acetate copolymer resins. The composition containing such a resin tends to further enhance the abrasion resistance of the resulting recorded matters. These resins may be used alone or as a mixture of two or more thereof.

The vinyl chloride-based resin is not particularly limited, and examples thereof include copolymer resins of vinyl chloride and one or more selected from the group consisting of vinyl acetate, vinylidene chloride, acryls, maleic acid, and vinyl alcohol. Among these copolymer resins, preferred are vinyl chloride-vinyl acetate copolymer resins of vinyl chloride and vinyl acetate; and more preferred are vinyl chloride-vinyl acetate copolymer resins having a glass transition temperature of 60° C. or more and 80° C. or less. The acryl may be any compound copolymerizable with vinyl chloride, and examples thereof include acrylic esters, such as methyl acrylate, ethyl acrylate, isopropyl acrylate, n-butyl acrylate, and 2-ethylhexyl acrylate; methacrylic esters, such as methyl methacrylate, ethyl methacrylate, isopropyl methacrylate, n-butyl methacrylate, isobutyl methacrylate, t-butyl methacrylate, cyclohexyl methacrylate, and 2-ethylhexyl methacrylate; carboxyl group-containing monomers, such as acrylic acid, methacrylic acid, maleic acid, fumaric acid, itaconic acid, mono-n-butyl maleate, mono-n-butyl fumarate, and mono-n-butyl itaconate; hydroxy group-containing (meth)acrylates; amide group-containing monomers; glycidyl group-containing monomers; cyano group-containing monomers; hydroxy group-containing allyl compounds; tertiary amino group-containing monomers; and alkoxysilyl group-containing monomers. These acryls may be used alone or in combination of two or more thereof.

The amount of the resin is preferably 0.1 mass % or more and 10 mass % or less, more preferably 0.3 mass % or more and 5.0 mass % or less, and most preferably 0.5 mass % or more and 3.0 mass % or less based on the total amount (100 mass %) of the composition. The composition containing a resin within such an amount tends to provide further excellent abrasion resistance.

The composition of the embodiment may further include one or more optional components that can be used in known non-aqueous ink compositions for ink jet, in addition to the above-mentioned components. Examples of the optional component include coloring materials such as a dye, surfactants, dispersants, penetrants, moisturizing agents, dissolution aids, viscosity modifiers, pH adjusters, antioxidants, preservatives, antifungal agents, corrosion inhibitors, chelating agents for capturing metal ions that influence dispersion, other additives, and solvents. These components may be each used alone or in combination.

Ink Jet Recording Method

The ink jet recording method of the embodiment includes a process of carrying out recording on a recording medium by an ink jet method using the above-described non-aqueous composition. Specifically, an image is recorded by discharging droplets of the non-aqueous composition and allowing the droplets to adhere to a recording medium, preferably, a low-absorbent recording medium.

In the present specification, the term "low-absorbent recording medium" refers to a recording medium that absorbs 10 mL/m$^2$ or less of water within 30 msec$^{1/2}$ from the start of contact with water when measured by a Bristow method. Such a property may be possessed by at least the recording surface. In this definition, examples of the "low-absorbent recording medium" in the present invention include non-absorbent recording media that do not absorb water at all. The Bristow method is most commonly used as a method for measuring the amount of liquid absorbed in a short period of time and is also employed by Japan Technical Association of the Pulp and Paper Industry (JAPAN TAPPI). The details of the test method are described in Standard No. 51 "Paper and Paperboard—Liquid Absorption Test Method—Bristow Method" in "JAPAN TAPPI Paper and Pulp Test Methods, 2000 Edition".

Examples of the low-absorbent recording medium include sheets, films, and fiber products containing low-absorbent materials. The low-absorbent recording medium may be composed of a base material (for example, paper, fiber, leather, plastic, glass, ceramics, or a metal) and a layer containing a low-absorbent material (hereinafter, also referred to as "low-absorbent layer") disposed on the surface of the base material. Examples of the low-absorbent material include, but not limited to, olefin-based resins, ester resins, urethane-based resins, acrylic-based resins, and vinyl chloride-based resins.

Among these media, a medium having a recording surface containing a vinyl chloride-based resin can be preferably used as the low-absorbent recording medium. Examples of the vinyl chloride-based resin include poly(vinyl chloride), vinyl chloride-ethylene copolymers, vinyl chloride-vinyl acetate copolymers, vinyl chloride-vinyl ether copolymers, vinyl chloride-vinylidene chloride copolymers, vinyl chloride-maleate copolymers, vinyl chloride-(meth)acrylic acid copolymers, vinyl chloride-(meth)acrylate copolymers, and vinyl chloride-urethane copolymers. The characteristics, such as thickness, shape, color, softening temperature, and hardness, of the low-absorbent recording medium are not particularly limited.

The non-aqueous composition of the embodiment having the above-described formulation can show advantageous effects, excellent intensity and abrasion resistance, against, in particular, a low-absorbent recording medium, specifically, a recording medium containing a vinyl chloride-based resin. Accordingly, the ink jet recording method according to the embodiment can record images having further excellent intensity and abrasion resistance by allowing droplets of the non-aqueous composition to adhere to, in particular, a low-absorbent recording medium, specifically, a recording medium containing a vinyl chloride-based resin.

The ink jet recording method of the embodiment may be performed with any ink jet recording apparatus, and preferred is a drop-on-demand ink jet recording apparatus. Examples of the drop-on-demand ink jet recording apparatus include those employing a piezoelectric element recording method using piezoelectric elements disposed in recording heads and those employing a heat jet recording method using heat energy generated by, for example, heaters of heat-generating resistor elements disposed in recording heads. Any recording method can be employed for the ink jet recording apparatus. An example of the ink jet recording apparatus of the embodiment will now be described in more detail.

Ink Jet Recording Apparatus

The ink jet recording apparatus of the embodiment can use a known ink jet printer. For example, the ink jet printer (hereinafter, also simply referred to as "printer") shown in FIG. 1 can be used.

FIG. 1 is a perspective view illustrating the configuration of a printer 1 in the embodiment. As shown in FIG. 1, the printer 1 includes a carriage 4 on which an ink jet recording head 2 is mounted and an ink cartridge 3 is detachably installed; a platen 5 disposed below the ink jet recording head (ink jet head) 2 and onto which a recording medium 6 is transported; a carriage-moving mechanism 7 for moving the carriage 4 in the medium width direction (main scanning direction S) of the recording medium 6; and a medium-transporting mechanism 8 for transporting the recording medium 6 in the medium-transporting direction. The printer 1 also has a controller CONT that controls the entire operation of the printer 1.

The recording head 2 includes cavities for discharging the non-aqueous composition accommodated therein from nozzles; discharge-driving portions provided to the corresponding cavities and applying driving force for discharge to the non-aqueous composition; and nozzles provided to the corresponding cavities and discharging the non-aqueous composition to the outside of the head. One head may be provided with a plurality of independent cavities and the discharge-driving portions and nozzles provided to the corresponding cavities. The discharge-driving portion can be formed using, for example, an electromechanical transducer, such as a piezoelectric element, that changes the volume of the cavity by mechanical deformation, or an electrothermal transducer that generates heat to form air bubbles in the non-aqueous composition and thereby discharges the non-aqueous composition. The printer 1 may include one head for one non-aqueous composition or may include a plurality of heads for one non-aqueous composition.

The ink cartridge 3 is composed of a plurality of independent cartridges, and each cartridge is filled with the non-aqueous composition. The cartridge filled with the non-aqueous composition may be removed from the carriage 4 during ordinary printing, but should be installed on the carriage 4 at least when the flow channel of the non-aqueous composition is rinsed.

The platen 5 includes a platen heater and is configured so as to heat the recording medium to a preset temperature. The recording head 2 does not have a built-in heater, but the temperature of the recording head is also increased as a result of heating of the recording medium, and thereby the temperature of the non-aqueous composition accommodated in the recording head 2 tends to raise. The printer 1 may include an after-heater (not shown) in the recording medium-transporting path downstream of the platen heater.

The above-described non-aqueous composition of the embodiment is discharged from the recording head 2. Herein, the temperature of the platen when the non-aqueous composition is discharged from the recording head 2 is preferably 35° C. or more and more preferably 40° C. or more, and is preferably 80° C. or less, more preferably 70° C. or less, more preferably 60° C. or less, and most preferably 50° C. or less. The platen heated with a platen heater to a temperature within the above-mentioned range is advantageous to provide higher quality to recorded matters.

In addition, in the embodiment, the frequency of discharge from the recording head 2 is preferably 1.0 kHz or more and 200 kHz or less. A discharge frequency lower than the upper limit of the above-mentioned range is preferred to provide more excellent discharge stability, and a discharge frequency higher than the lower limit of the above-mentioned range is preferred to provide a higher recording speed. The term "discharge frequency" means the frequency of discharging each non-aqueous composition droplet as a discharge unit. The discharge frequency is preferably 2.0 kHz or more, more preferably 3.0 kHz or more, more preferably 5.0 kHz or more, and most preferably 10 kHz or more from the viewpoint of further accelerating the recording speed. In addition, the discharge frequency is preferably 200 kHz or less, more preferably 150 kHz or less, more preferably 100 kHz or less, and most preferably 50 kHz or less from the viewpoint of enhancing the discharge stability. Furthermore, the discharge frequency is preferably 20 kHz or less and more preferably 15 kHz or less from the viewpoint of providing further excellent discharge stability while maintaining the recording speed. At the same time, the discharge frequency is preferably 15 kHz or more and more preferably 20 kHz or more from the viewpoint of providing higher recording speed while maintaining the discharge stability.

As an example of the printer 1 of the embodiment, a so-called on-carriage type printer having the ink cartridge mounted on the carriage 4 was described above, but the printer is not limited thereto. For example, the printer may be of a so-called off-carriage type, where an ink container (such as an ink pack or ink cartridge) filled with the non-aqueous composition is installed on, for example, the housing of the printer 1 and the non-aqueous composition is supplied to the head 2 through an ink supply tube.

The ink jet recording apparatus of the embodiment can employ an ink set including a plurality of non-aqueous compositions. The ink set of the embodiment may include a plurality of the non-aqueous ink jet compositions of the embodiment or may further include one or more non-aqueous compositions (other non-aqueous composition(s)) different from the non-aqueous ink jet compositions of the embodiment. In such a case, the ink set may include a magenta ink of the non-aqueous composition of the embodiment and a yellow ink and a cyan ink of the other non-aqueous compositions. Alternatively, the ink set may include a red ink of the non-aqueous composition of the embodiment and a magenta ink, a yellow ink, and a cyan ink of the other non-aqueous compositions. From the viewpoint of achieving more excellent color reproducibility, the non-aqueous composition of the embodiment is preferably used as a red ink, and the other non-aqueous compositions are preferably used as magenta, yellow, and cyan inks.

EXAMPLES

The first embodiment will now be more specifically described with reference to Examples and Comparative Examples, but the embodiment is not limited to the following Examples, within the scope of the present invention.

The main materials for the non-aqueous compositions used in the following Examples and Comparative Examples are as follows:
Materials for Non-Aqueous Composition
Pigment
 C.I. Pigment Red 254 (PR-254) (manufactured by Tokyo Chemical Industry Co., Ltd., trade name: Pigment Red 254)
 C.I. Pigment Red 177 (PR-177) (manufactured by Hangzhou Xcolor Chemical Company, trade name: Pigment Red 177)
 C.I. Pigment Red 179 (PR-179) (manufactured by Gaoyou Auxiliary Factory, trade name: Pigment Red 179)
 C.I. Pigment Red 224 (PR-224) (manufactured by Hangzhou Xcolor Chemical Company, trade name: Pigment Red 224)
Organic Solvent
 Diethylene glycol methyl ethyl ether (manufactured by Nippon Nyukazai Co., Ltd., trade name: MEDG)
 Diethylene glycol diethyl ether (manufactured by Nippon Nyukazai Co., Ltd., trade name: DEDG)
 Triethylene glycol monobutyl ether (manufactured by Tokyo Chemical Industry Co., Ltd., trade name: Triethylene Glycol Monobutyl Ether)
 Tetraethylene glycol monobutyl ether (manufactured by KH Neochem Co., Ltd., trade name: Butycenol 40)
 Dipropylene glycol monomethyl ether (manufactured by Tokyo Chemical Industry Co., Ltd., trade name: Dipropylene Glycol Monomethyl Ether)
 Gamma-butyrolactone (manufactured by Tokyo Chemical Industry Co., Ltd., trade name: γ-Butyrolactone)
 Delta-valerolactone (manufactured by Tokyo Chemical Industry Co., Ltd., trade name: δ-Valerolactone)
 Methyl caprylate (manufactured by Tokyo Chemical Industry Co., Ltd., trade name: Methyl n-Octanoate)
 Methyl caprate (manufactured by Tokyo Chemical Industry Co., Ltd., trade name: Methyl Decanoate)
 3-Methoxybutyl acetate (manufactured by Daicel Corporation, trade name: 3-Methoxybutyl Acetate)
 3-Methoxy-3-methyl-1-butyl acetate (manufactured by Kuraray Co., Ltd., trade name: Solfit AC)
Resin
 Copolymer resin of vinyl chloride and vinyl acetate (manufactured by Nissin Chemical Co., Ltd., trade name: Solbin CL)
Pigment-Dispersing Agent
 Solsperse 37500 (trade name, manufactured by The Lubrizol Corporation)
Surfactant
 BYK-340 (trade name, manufactured by BYK Chemie Japan K.K.)
Preparation of Non-Aqueous Composition Materials shown in Tables 1 and 2 were mixed at the ratios shown in the tables and were sufficiently stirred to give each non-aqueous composition. In Tables 1 and 2, the unit of the numerical values relating to the materials used is parts by mass, unless otherwise specified. The water content in each non-aqueous composition was adjusted to that shown in Table 1 or 2. Specifically, the amount of water in each non-aqueous composition immediately after the preparation was about 5.0 mass % based on the total amount of the composition. Accordingly, in a non-aqueous composition of which the amount of water shown in Table 1 or 2 was less than 5.0 mass %, a dehydrating agent (Molecular Sieve) was added to the organic solvent of the composition and was collected after the elapse of a certain time to adjust the amount of water. In a non-aqueous composition of which the amount of water shown in Table 1 or 2 was higher than 5.0 mass %, a necessary amount of deionized water was added to the organic solvent of the composition to adjust the amount of water. The numerical values in "Water content (mass %)" in Tables 1 and 2 indicate the amounts of water based on the total amount (100 mass %) of the non-aqueous ink jet composition. The numerical values in "Reference water content (mass %)" in Tables 1 and 2 indicate the amounts of water based on the total amount of the non-aqueous composition excluding water.
Physical Property 1: Amount of Water The amount of water in each of the non-aqueous compositions or each of the organic solvents immediately after the adjustment of the amount of water was measured with a Karl Fischer moisture meter MKA-520 (manufactured by Kyoto Electronics Manufacturing Co., Ltd.). The results of measurement are shown in Tables 1 and 2. The unit of the numerical values is mass %.

TABLE 1

|  | Example 1 | Example 2 | Example 3 | Example 4 | Example 5 | Example 6 | Example 7 | Example 8 | Example 9 | Example 10 | Example 11 | Example 12 | Example 13 | Example 14 |
|---|---|---|---|---|---|---|---|---|---|---|---|---|---|---|
| PR254 | 3.0 | 3.0 | 3.0 | 3.0 | 3.0 | 3.0 | 3.0 | 3.0 | 3.0 | 3.0 | 3.0 | 1.0 | 5.0 | 5.0 |
| PR177 | — | — | — | — | — | — | — | — | — | — | — | — | — | — |
| PR179 | — | — | — | — | — | — | — | — | — | — | — | — | — | — |
| PR224 | — | — | — | — | — | — | — | — | — | — | — | — | — | — |
| Diethylene glycol methyl ethyl ether | 74 | 74 | 74 | 64 | 79 | — | 74 | 24 | 24 | 24 | 24 | 76 | 72 | 72 |
| Diethylene glycol diethyl ether | — | — | — | — | — | 74 | — | — | — | — | — | — | — | — |
| Triethylene glycol monobutyl ether | 10 | — | — | 20 | 5 | 10 | 10 | 10 | 10 | 10 | 10 | 10 | 10 | 10 |
| Tetraethylene glycol monobutyl ether | — | 10 | — | — | — | — | — | — | — | — | — | — | — | — |
| Dipropylene glycol monomethyl ether | — | — | 10 | — | — | — | — | — | — | — | — | — | — | — |
| Gamma-butyrolactone | 10 | 10 | 10 | 10 | 10 | 10 | — | 10 | 10 | 10 | 10 | 10 | 10 | 10 |
| Delta-valerolactone | — | — | — | — | — | — | 10 | — | — | — | — | — | — | — |
| Methyl caprylate | — | — | — | — | — | — | — | 50 | — | — | — | — | — | — |
| Methyl caprate | — | — | — | — | — | — | — | — | 50 | — | — | — | — | — |
| 3-Methoxybutyl acetate | — | — | — | — | — | — | — | — | — | 50 | — | — | — | — |
| 3-Methoxy-3-methyl-1-butyl acetate | — | — | — | — | — | — | — | — | — | — | 50 | — | — | — |
| Solsperse 37500 | 1.9 | 1.9 | 1.9 | 1.9 | 1.9 | 1.9 | 1.9 | 1.9 | 1.9 | 1.9 | 1.9 | 1.9 | 1.9 | 1.9 |
| BYK-340 | 0.1 | 0.1 | 0.1 | 0.1 | 0.1 | 0.1 | 0.1 | 0.1 | 0.1 | 0.1 | 0.1 | 0.1 | 0.1 | 0.1 |
| Solbin CL | 1.0 | 1.0 | 1.0 | 1.0 | 1.0 | 1.0 | 1.0 | 1.0 | 1.0 | 1.0 | 1.0 | 1.0 | 1.0 | 1.0 |
| Water content (mass %) | 0.3 | 0.3 | 0.3 | 0.3 | 0.3 | 0.3 | 0.3 | 0.3 | 0.3 | 0.3 | 0.3 | 0.3 | 0.3 | 0.05 |
| Reference water content (mass %) | 0.3 | 0.3 | 0.3 | 0.3 | 0.3 | 0.3 | 0.3 | 0.3 | 0.3 | 0.3 | 0.3 | 0.3 | 0.3 | 0.05 |
| Storage stability | Excellent | Excellent | Excellent | Good | Excellent | Excellent | Excellent | Excellent | Excellent | Excellent | Excellent | Excellent | Good | Excellent |
| Image quality (intensity) | Excellent | Excellent | Excellent | Excellent | Good | Excellent | Excellent | Excellent | Excellent | Excellent | Excellent | Excellent | Good | Excellent |
| Manufacturing cost by dehydrating process | Excellent | Excellent | Excellent | Excellent | Excellent | Excellent | Excellent | Excellent | Excellent | Excellent | Excellent | Excellent | Excellent | Good |

TABLE 2

|  | Example 15 | Example 16 | Example 17 | Example 18 | Example 19 | Comparative Example 1 | Comparative Example 2 | Comparative Example 3 | Comparative Example 4 |
|---|---|---|---|---|---|---|---|---|---|
| PR254 | 3.0 | 3.0 | 3.0 | 3.0 | 3.0 | 3.0 | 3.0 | — | — |
| PR177 | — | — | — | — | — | — | — | 3.0 | — |
| PR179 | — | — | — | — | — | — | — | — | 3.0 |
| PR224 | — | — | — | — | — | — | — | — | — |
| Diethylene glycol methyl ethyl ether | 74 | 74 | 74 | 74 | 74 | 74 | 74 | 74 | 74 |
| Diethylene glycol diethyl ether | — | — | — | — | — | — | — | — | — |
| Triethylene glycol monobutyl ether | 10 | 10 | 10 | 10 | 10 | 10 | 10 | 10 | 10 |
| Tetraethylene glycol monobutyl ether | — | — | — | — | — | — | — | — | — |
| Dipropylene glycol monomethyl ether | — | — | — | — | — | — | — | — | — |
| Gamma-butyrolactone | 10 | 10 | 10 | 10 | 10 | 10 | 10 | 10 | 10 |
| Delta-valerolactone | — | — | — | — | — | — | — | — | — |
| Methyl caprylate | — | — | — | — | — | — | — | — | — |
| Methyl caprate | — | — | — | — | — | — | — | — | — |
| 3-Methoxybutyl acetate | — | — | — | — | — | — | — | — | — |
| 3-Methoxy-3-methyl-1-butyl acetate | — | — | — | — | — | — | — | — | — |
| Solsperse 37500 | 1.9 | 1.9 | 1.9 | 1.9 | 1.9 | 1.9 | 1.9 | 1.9 | 1.9 |
| BYK-340 | 0.1 | 0.1 | 0.1 | 0.1 | 0.1 | 0.1 | 0.1 | 0.1 | 0.1 |
| Solbin CL | 1.0 | 1.0 | 1.0 | 1.0 | 1.0 | 1.0 | 1.0 | 1.0 | 1.0 |

TABLE 2-continued

| | | | | | | | | | |
|---|---|---|---|---|---|---|---|---|---|
| Water content (mass %) | 0.1 | 4.8 | 6.5 | 9.1 | 0.01 | 9.5 | 9.9 | 0.3 | 0.3 |
| Reference water content (mass %) | 0.1 | 5.0 | 7.0 | 10.0 | 0.01 | 10.5 | 11.0 | 0.3 | 0.3 |
| Storage stability | Excellent | Good | Good | Good | Excellent | Poor | Poor | Excellent | Excellent |
| Image quality (intensity) | Excellent | Excellent | Excellent | Excellent | Excellent | Excellent | Excellent | Poor | Poor |
| Manufacturing cost by dehydrating process | Good | Excellent | Excellent | Excellent | Poor | Excellent | Excellent | Excellent | Excellent |

| | Comparative Example 5 | Comparative Example 6 | Comparative Example 7 | Comparative Example 8 | Comparative Example 9 | Comparative Example 10 | Comparative Example 11 |
|---|---|---|---|---|---|---|---|
| PR254 | — | — | — | — | — | — | — |
| PR177 | — | 3.0 | — | — | 3.0 | — | — |
| PR179 | — | — | 3.0 | — | — | 3.0 | — |
| PR224 | 3.0 | — | — | 3.0 | — | — | 3.0 |
| Diethylene glycol methyl ethyl ether | 74 | 74 | 74 | 74 | 74 | 74 | 74 |
| Diethylene glycol diethyl ether | — | — | — | — | — | — | — |
| Triethylene glycol monobutyl ether | 10 | 10 | 10 | 10 | 10 | 10 | 10 |
| Tetraethylene glycol monobutyl ether | — | — | — | — | — | — | — |
| Dipropylene glycol monomethyl ether | — | — | — | — | — | — | — |
| Gamma-butyrolactone | 10 | 10 | 10 | 10 | 10 | 10 | 10 |
| Delta-valerolactone | — | — | — | — | — | — | — |
| Methyl caprylate | — | — | — | — | — | — | — |
| Methyl caprate | — | — | — | — | — | — | — |
| 3-Methoxybutyl acetate | — | — | — | — | — | — | — |
| 3-Methoxy-3-methyl-1-butyl acetate | — | — | — | — | — | — | — |
| Solsperse 37500 | 1.9 | 1.9 | 1.9 | 1.9 | 1.9 | 1.9 | 1.9 |
| BYK-340 | 0.1 | 0.1 | 0.1 | 0.1 | 0.1 | 0.1 | 0.1 |
| Solbin CL | 1.0 | 1.0 | 1.0 | 1.0 | 1.0 | 1.0 | 1.0 |
| Water content (mass %) | 0.3 | 9.9 | 9.9 | 9.9 | 4.8 | 4.8 | 4.8 |
| Reference water content (mass %) | 0.3 | 11.0 | 11.0 | 11.0 | 5.0 | 5.0 | 5.0 |
| Storage stability | Excellent | Fair | Fair | Fair | Excellent | Excellent | Excellent |
| Image quality (intensity) | Poor | Poor | Poor | Poor | Poor | Poor | Poor |
| Manufacturing cost by dehydrating process | Excellent | Excellent | Excellent | Excellent | Excellent | Excellent | Excellent |

Formation of Recorded Matter

A PVC medium (manufactured by 3M Company, Model No. IJ180-10) as a recording medium was placed in an ink jet printer (manufactured by Seiko Epson Corporation, trade name: SC-530650); any of the compositions prepared in Examples and Comparative Examples was loaded into the discharge head; the temperature of the platen was maintained at 45° C. during the formation of a recorded matter and for 1 minute after the formation of the recorded matter; and a solid pattern was formed at an application amount of 10 mg/inch$^2$ and a target resolution of 720×720 dpi to give each recorded matter. Even if an insufficient discharge part was caused by a discharge defect, the defective portion was not compensated.

Evaluation 1: Storage Stability

Any of the non-aqueous compositions prepared in Examples and Comparative Examples was put in the ink container (polyethylene film container) of an ink jet printer (manufactured by Seiko Epson Corporation, trade name: SC-530650) and was subjected to an acceleration test at 60° C. for 7 days. The viscosity of each non-aqueous composition was then measured at 20° C., and the thickening rate [{(viscosity of ink at 20° C. after acceleration test)/(viscosity of ink at 20° C. before acceleration test)}×100] was calculated to evaluate the storage stability based on the following criteria. The results are shown in Tables 1 and 2. The viscosity of each non-aqueous composition at 20° C. was measured with a viscometer (manufactured by Physica, trade name: MCR-300) using a cone (diameter: 75 mm, angle: 1°) at a rotation speed of 100 rpm.

Evaluation Criteria

Excellent: thickening rate of less than 1%,
Good: thickening rate of 1% or more and less than 3%,
Fair: thickening rate of 3% or more and less than 4%, and
Poor: thickening rate of 4% or more.

Evaluation 2: Image Quality (Intensity)

The intensity (C*) of each of the resulting recorded matters was evaluated. Specifically, the value a* and the value b* of each recorded matter were measured with a spectrophotometer (manufactured by GretagMacbeth, trade name: Spectrolino), and the value C* was calculated. The intensity was evaluated based on the following evaluation criteria. The calculated value C* was rounded off to the nearest whole number. The results are shown in Tables 1 and 2.

Evaluation Criteria

Excellent: value C* of 100 or more,
Good: value C* of 90 to 99, and
Poor: value C* of 89 or less.

Evaluation 3: Manufacturing Cost

The manufacturing cost was evaluated from each procedure performed for controlling the amount of water in each non-aqueous composition based on the following evaluation criteria. The results are shown in Tables 1 and 2.

Evaluation Criteria

Excellent: the amount of water before the procedure is 5.0 mass %, or the time from addition to collection of the dehydrating agent is 1 hour or less;
Good: the time from addition to collection of the dehydrating agent is longer than one 1 hour and 50 hours or less; and
Poor: the time the time from addition to collection of the dehydrating agent is longer than 50 hours.

The comparison between the results of Examples and Comparative Examples shown in Tables 1 and 2 demonstrated that the non-aqueous ink jet compositions according to the present invention can form recorded matters having excellent abrasion resistance and intensity and further demonstrated that the non-aqueous ink jet compositions also have excellent storage stability. In "Evaluation 1: Storage stability", the results demonstrated no non-aqueous composition showed a thickening rate of 4% or more.

The second embodiment will now be more specifically described with reference to Examples and Comparative Examples, but the embodiment is not limited to the following Examples, within the scope of the present invention.

The main materials for the non-aqueous compositions used in the following Examples and Comparative Examples are as follows:

Materials for Non-Aqueous Composition

Pigment

C.I. Pigment Red 254 (PR-254) (manufactured by Tokyo Chemical Industry Co., Ltd., trade name: Pigment Red 254)

C.I. Pigment Red 177 (PR-177) (manufactured by Hangzhou Xcolor Chemical Company, trade name: Pigment Red 177)

C.I. Pigment Red 179 (PR-179) (manufactured by Gaoyou Auxiliary Factory, trade name: Pigment Red 179)

C.I. Pigment Red 224 (PR-224) (manufactured by Hangzhou Xcolor Chemical Company, trade name: Pigment Red 224)

Organic Solvent

Diethylene glycol methyl ethyl ether (manufactured by Nippon Nyukazai Co., Ltd., trade name: MEDG)

Diethylene glycol diethyl ether (manufactured by Nippon Nyukazai Co., Ltd., trade name: DEDG)

Triethylene glycol monobutyl ether (manufactured by Tokyo Chemical Industry Co., Ltd., trade name: Triethylene Glycol Monobutyl Ether)

Tetraethylene glycol monobutyl ether (manufactured by KH Neochem Co., Ltd., trade name: Butycenol 40)

Dipropylene glycol monomethyl ether (manufactured by Tokyo Chemical Industry Co., Ltd., trade name: Dipropylene Glycol Monomethyl Ether)

Gamma-butyrolactone (manufactured by Tokyo Chemical Industry Co., Ltd., trade name: γ-Butyrolactone)

Delta-valerolactone (manufactured by Tokyo Chemical Industry Co., Ltd., trade name: δ-Valerolactone)

Methyl caprylate (manufactured by Tokyo Chemical Industry Co., Ltd., trade name: Methyl n-Octanoate)

Methyl caprate (manufactured by Tokyo Chemical Industry Co., Ltd., trade name: Methyl Decanoate)

3-Methoxybutyl acetate (manufactured by Daicel Corporation, trade name: 3-Methoxybutyl Acetate)

3-Methoxy-3-methyl-1-butyl acetate (manufactured by Kuraray Co., Ltd., trade name: Solfit AC)

Resin

Copolymer resin of vinyl chloride and vinyl acetate (manufactured by Nissin Chemical Co., Ltd., trade name: Solbin CL)

Pigment-Dispersing Agent

Solsperse 37500 (trade name, manufactured by The Lubrizol Corporation)

Surfactant

BYK-340 (trade name, manufactured by BYK Chemie Japan K.K.)

Preparation of Non-Aqueous Composition

The materials shown in Tables 3 and 4 were mixed at the ratios shown in the tables and were sufficiently stirred to give each non-aqueous composition. In Tables 3 and 4, the unit of the numerical values relating to the materials is mass %, unless otherwise specified, and the total amount excluding the amount of water is 100.0 mass %. The amount of each inorganic metal in each non-aqueous composition was adjusted to that shown in Table 3 or 4 by the process described in the following "Physical property 1: Inorganic metal content".

Physical Property 1: Inorganic Metal Content

An ion exchange resin powder IXE-6107 (manufactured by Toagosei Co., Ltd., 0.1 parts by mass) was added to the non-aqueous composition (100 parts by mass) of Example 1 shown in Table 3, and the mixture was stirred at a rotation speed of 100 rpm for 60 minutes, followed by centrifugation at 20000 G for 10 minutes and then filtering with a 3-μm membrane filter. After the filtering, the amount of each inorganic metal was measured by ICP emission spectrometry (ICP emission spectrometer, manufactured by Hitachi High-Technologies Corporation). Table 3 shows the results of measurement of three inorganic metal species (sodium, potassium, and calcium), of which the amounts were higher in this order. Other non-aqueous compositions were subjected to the same procedure as above except that the stirring time of 10 minutes was changed to adjust the results of measurement in Examples and Comparative Examples to those shown in Tables 3 and 4. The unit of the numerical values is mass ppm.

TABLE 3

| | Example 1 | Example 2 | Example 3 | Example 4 | Example 5 | Example 6 | Example 7 |
|---|---|---|---|---|---|---|---|
| PR254 | 3.0 | 3.0 | 3.0 | 3.0 | 3.0 | 3.0 | 3.0 |
| PR177 | — | — | — | — | — | — | — |
| PR179 | — | — | — | — | — | — | — |
| PR224 | — | — | — | — | — | — | — |
| Diethylene glycol methyl ethyl ether | 74 | 74 | 74 | 84 | 84 | 79 | 79 |
| Diethylene glycol diethyl ether | — | — | — | — | — | — | — |
| Triethylene glycol monobutyl ether | 10 | — | — | 0 | 0 | 5 | 5 |
| Tetraethylene glycol monobutyl ether | — | 10 | — | — | — | — | — |
| Dipropylene glycol monomethyl ether | — | — | 10 | — | — | — | — |
| Gamma-butyrolactone | 10 | 10 | 10 | 10 | 10 | 10 | 10 |
| Delta-valerolactone | — | — | — | — | — | — | — |
| Methyl caprylate | — | — | — | — | — | — | — |
| Methyl caprate | — | — | — | — | — | — | — |
| 3-Methoxybutyl acetate | — | — | — | — | — | — | — |
| 3-Methoxy-3-methyl-1-butyl acetate | — | — | — | — | — | — | — |
| Solsperse 37500 | 1.9 | 1.9 | 1.9 | 1.9 | 1.9 | 1.9 | 1.9 |
| BYK-340 | 0.1 | 0.1 | 0.1 | 0.1 | 0.1 | 0.1 | 0.1 |
| Solbin CL | 1.0 | 1.0 | 1.0 | 1.0 | 1.0 | 1.0 | 1.0 |
| Metal amount (Na amount)/ppm | 4.0 | 4.0 | 4.0 | 4.0 | 50 | 4.0 | 50 |
| Metal amount (K amount)/ppm | 4.0 | 4.0 | 4.0 | 4.0 | 50 | 4.0 | 50 |
| Metal amount (Ca amount)/ppm | 4.0 | 4.0 | 4.0 | 4.0 | 50 | 4.0 | 50 |

TABLE 3-continued

| | | | | | | | |
|---|---|---|---|---|---|---|---|
| Storage stability | Excellent | Excellent | Excellent | Excellent | Excellent | Excellent | Good |
| Intensity | Excellent | Excellent | Excellent | Fair | Fair | Good | Good |
| Manufacturing cost | Excellent | Excellent | Excellent | Excellent | Excellent | Excellent | Excellent |

| | Example 8 | Example 9 | Example 10 | Example 11 | Example 12 | Example 13 | Example 14 |
|---|---|---|---|---|---|---|---|
| PR254 | 3.0 | 3.0 | 3.0 | 3.0 | 3.0 | 3.0 | 3.0 |
| PR177 | — | — | — | — | — | — | — |
| PR179 | — | — | — | — | — | — | — |
| PR224 | — | — | — | — | — | — | — |
| Diethylene glycol methyl ethyl ether | 64 | — | 74 | 24 | 24 | 24 | 24 |
| Diethylene glycol diethyl ether | — | 74 | — | — | — | — | — |
| Triethylene glycol monobutyl ether | 20 | 10 | 10 | 10 | 10 | 10 | 10 |
| Tetraethylene glycol monobutyl ether | — | — | — | — | — | — | — |
| Dipropylene glycol monomethyl ether | — | — | — | — | — | — | — |
| Gamma-butyrolactone | 10 | 10 | — | 10 | 10 | 10 | 10 |
| Delta-valerolactone | — | — | 10 | — | — | — | — |
| Methyl caprylate | — | — | — | 50 | — | — | — |
| Methyl caprate | — | — | — | — | 50 | — | — |
| 3-Methoxybutyl acetate | — | — | — | — | — | 50 | — |
| 3-Methoxy-3-methyl-1-butyl acetate | — | — | — | — | — | — | 50 |
| Solsperse 37500 | 1.9 | 1.9 | 1.9 | 1.9 | 1.9 | 1.9 | 1.9 |
| BYK-340 | 0.1 | 0.1 | 0.1 | 0.1 | 0.1 | 0.1 | 0.1 |
| Solbin CL | 1.0 | 1.0 | 1.0 | 1.0 | 1.0 | 1.0 | 1.0 |
| Metal amount (Na amount)/ppm | 4.0 | 4.0 | 4.0 | 4.0 | 4.0 | 4.0 | 4.0 |
| Metal amount (K amount)/ppm | 4.0 | 4.0 | 4.0 | 4.0 | 4.0 | 4.0 | 4.0 |
| Metal amount (Ca amount)/ppm | 4.0 | 4.0 | 4.0 | 4.0 | 4.0 | 4.0 | 4.0 |
| Storage stability | Good | Excellent | Excellent | Excellent | Excellent | Excellent | Excellent |
| Intensity | Excellent | Excellent | Excellent | Good | Good | Good | Good |
| Manufacturing cost | Excellent | Excellent | Excellent | Excellent | Excellent | Excellent | Excellent |

TABLE 4

| | Example 15 | Example 16 | Example 17 | Example 18 | Example 19 | Comparative Example 1 | Comparative Example 2 | Comparative Example 3 |
|---|---|---|---|---|---|---|---|---|
| PR254 | 3.0 | 3.0 | 3.0 | 3.0 | 3.0 | 3.0 | 3.0 | 3.0 |
| PR177 | — | — | — | — | — | — | — | — |
| PR179 | — | — | — | — | — | — | — | — |
| PR224 | — | — | — | — | — | — | — | — |
| Diethylene glycol methyl ethyl ether | 74 | 74 | 74 | 74 | 74 | 74 | 74 | 74 |
| Diethylene glycol diethyl ether | — | — | — | — | — | — | — | — |
| Triethylene glycol monobutyl ether | 10 | 10 | 10 | 10 | 10 | 10 | 10 | 10 |
| Tetraethylene glycol monobutyl ether | — | — | — | — | — | — | — | — |
| Dipropylene glycol monomethyl ether | — | — | — | — | — | — | — | — |
| Gamma-butyrolactone | 10 | 10 | 10 | 10 | 10 | 10 | 10 | 10 |
| Delta-valerolactone | — | — | — | — | — | — | — | — |
| Methyl caprylate | — | — | — | — | — | — | — | — |
| Methyl caprate | — | — | — | — | — | — | — | — |
| 3-Methoxybutyl acetate | — | — | — | — | — | — | — | — |
| 3-Methoxy-3-methyl-1-butyl acetate | — | — | — | — | — | — | — | — |
| Solsperse 37500 | 1.9 | 1.9 | 1.9 | 1.9 | 1.9 | 1.9 | 1.9 | 1.9 |
| BYK-340 | 0.1 | 0.1 | 0.1 | 0.1 | 0.1 | 0.1 | 0.1 | 0.1 |
| Solbin CL | 1.0 | 1.0 | 1.0 | 1.0 | 1.0 | 1.0 | 1.0 | 1.0 |
| Metal amount (Na amount)/ppm | 0.1 | 50 | 80 | 70 | 90 | 0.05 | 110 | 110 |
| Metal amount (K amount)/ppm | 0.1 | 50 | 40 | 70 | 90 | 0.05 | 110 | 50 |
| Metal amount (Ca amount)/ppm | 0.1 | 50 | 40 | 70 | 90 | 0.05 | 110 | 50 |
| Storage stability | Excellent | Fair | Fair | Fair | Fair | Excellent | Poor | Poor |
| Intensity | Excellent | Excellent | Excellent | Excellent | Excellent | Excellent | Excellent | Excellent |
| Manufacturing cost | Good | Excellent | Excellent | Excellent | Excellent | Poor | Excellent | Excellent |

| | Comparative Example 4 | Comparative Example 5 | Comparative Example 6 | Comparative Example 7 | Comparative Example 8 | Comparative Example 9 |
|---|---|---|---|---|---|---|
| PR254 | — | — | — | — | — | — |
| PR177 | 3.0 | — | — | 3.0 | — | — |
| PR179 | — | 3.0 | — | — | 3.0 | — |
| PR224 | — | — | 3.0 | — | — | 3.0 |
| Diethylene glycol methyl ethyl ether | 74 | 74 | 74 | 24 | 24 | 24 |
| Diethylene glycol diethyl ether | — | — | — | — | — | — |
| Triethylene glycol monobutyl ether | 10 | 10 | 10 | 10 | 10 | 10 |
| Tetraethylene glycol monobutyl ether | — | — | — | — | — | — |
| Dipropylene glycol monomethyl ether | — | — | — | — | — | — |
| Gamma-butyrolactone | 10 | 10 | 10 | 10 | 10 | 10 |
| Delta-valerolactone | — | — | — | — | — | — |
| Methyl caprylate | — | — | — | — | — | — |

TABLE 4-continued

| | | | | | | |
|---|---|---|---|---|---|---|
| Methyl caprate | — | — | — | — | — | — |
| 3-Methoxybutyl acetate | — | — | — | 50 | 50 | 50 |
| 3-Methoxy-3-methyl-1-butyl acetate | — | — | — | — | — | — |
| Solsperse 37500 | 1.9 | 1.9 | 1.9 | 1.9 | 1.9 | 1.9 |
| BYK-340 | 0.1 | 0.1 | 0.1 | 0.1 | 0.1 | 0.1 |
| Solbin CL | 1.0 | 1.0 | 1.0 | 1.0 | 1.0 | 1.0 |
| Metal amount (Na amount)/ppm | 4.0 | 4.0 | 4.0 | 50 | 50 | 50 |
| Metal amount (K amount)/ppm | 4.0 | 4.0 | 4.0 | 50 | 50 | 50 |
| Metal amount (Ca amount)/ppm | 4.0 | 4.0 | 4.0 | 50 | 50 | 50 |
| Storage stability | Excellent | Excellent | Excellent | Good | Good | Good |
| Intensity | Poor | Poor | Poor | Poor | Poor | Poor |
| Manufacturing cost | Excellent | Excellent | Excellent | Excellent | Excellent | Excellent |

Formation of Recorded Matter

A PVC medium (manufactured by 3M Company, Model No. IJ180-10) as a recording medium was placed in an ink jet printer (manufactured by Seiko Epson Corporation, trade name: SC-530650); any of the compositions prepared in Examples and Comparative Examples was loaded into the discharge head; the temperature of the platen was maintained at 45° C. during the formation of a recorded matter and for 1 minute after the formation of the recorded matter; and a solid pattern was formed at an application amount of 10 mg/inch$^2$ and a target resolution of 720×720 dpi to give each recorded matter. Even if an insufficient discharge part was caused by a discharge defect, the defective portion was not compensated.

Evaluation 1: Storage Stability

Any of the non-aqueous compositions prepared in Examples and Comparative Examples was put in the ink container of an ink jet printer (manufactured by Seiko Epson Corporation, trade name: SC-530650) and was subjected to an acceleration test at 60° C. for 7 days. The viscosity of each non-aqueous composition was then measured at 20° C., and the thickening rate [{(viscosity of ink at 20° C. after acceleration test)/(viscosity of ink at 20° C. before acceleration test)}×100] was calculated to evaluate the storage stability based on the following criteria. The results are shown in Tables 3 and 4. The viscosity of each non-aqueous composition at 20° C. was measured with a viscometer (manufactured by Physica, trade name: MCR-300) using a cone (diameter: 75 mm, angle: 1°) at a rotation speed of 100 rpm.

Evaluation Criteria

Excellent: a thickening rate of less than 1% and no visually observable crystalline substance;

Good: a thickening rate of 1% or more and less than 3% and no visually observable crystalline substance;

Fair: a thickening rate of 3% or more and less than 4% and no visually observable crystalline substance; and Poor: a thickening rate of 4% or more, or a thickening rate of less than 4% and visually observable crystalline substance.

Evaluation 2: Intensity

The intensity (C*) of each of the resulting recorded matters was evaluated. Specifically, the value a* and the value b* of each recorded matter were measured with a spectrophotometer (manufactured by GretagMacbeth, trade name: Spectrolino), and the value C* was calculated. The intensity was evaluated based on the following evaluation criteria. The calculated value C* was rounded off to the nearest whole number. The results are shown in Tables 3 and 4.

Evaluation Criteria

Excellent: value C* of 110 or more,

Good: value C* of 100 or more and less than 110,

Fair: value C* of 90 or more and less than 110, and

Poor: value C* of 89 or less.

Evaluation 3: Manufacturing Cost

The manufacturing cost was evaluated from the time of stirring for adjusting the inorganic metal content in each non-aqueous composition based on the following evaluation criteria. The results are shown in Tables 3 and 4.

Evaluation Criteria

Excellent: the stirring time is 0 min or more and less than 30 min;

Good: the stirring time is 30 min or more and less than 2 hours; and

Poor: the stirring time is 2 hours or more.

The comparison between the results of Examples and Comparative Examples shown in Tables 3 and 4 demonstrated that the non-aqueous ink jet compositions according to the present invention can form recorded matters having excellent intensity and further demonstrated that the non-aqueous ink jet compositions also have excellent storage stability. It was also demonstrated that the non-aqueous ink jet compositions are excellent in manufacturing cost. In "Evaluation 1: Storage stability", the results demonstrated no non-aqueous composition showed a thickening rate of 4% or more.

The entire disclosures of Japanese Patent Application Nos. 2016-013484, filed Jan. 27, 2016 and 2016-013534, filed Jan. 27, 2016 are expressly incorporated by reference herein.

What is claimed is:

1. A non-aqueous ink jet composition comprising:
a pigment component containing a diketopyrrolopyrrole pigment;
an organic solvent; and
an inorganic metal,
wherein the organic solvent contains one or more glycol ethers,
the inorganic metal includes at least one of alkali metals and alkaline earth metals, and an amount of a first inorganic metal of which the amount is the highest among the alkali metals and the alkaline earth metals is 0.1 mass ppm or more and 100 mass ppm or less based on the total amount of the non-aqueous ink jet composition,
an amount of water in the non-aqueous ink jet composition is 3.0 mass % or less, and
the one or more glycol ethers are selected from the group consisting of ethylene glycol dibutyl ether, diethylene glycol ethyl methyl ether, diethylene glycol dibutyl ether, triethylene glycol diethyl ether, triethylene glycol dibutyl ether, tetraethylene glycol diethyl ether, tetraethylene glycol dibutyl ether, propylene glycol dimethyl ether, propylene glycol diethyl ether, dipropylene glycol dimethyl ether, tetraethylene glycol monobutyl ether, and dipropylene glycol diethyl ether, and the diketopyrrolopyrrole pigment is selected from a group consisting of C.I. Pigment Red 254, C.I. Pigment Red 255, C.I. Pigment Red 264, C.I. Pigment Red 270, and C.I. Pigment Red 272.

2. The non-aqueous ink jet composition according to claim 1, wherein the amount of a second inorganic metal of which the amount comes after that of the first inorganic metal among the alkali metals and the alkaline earth metals is less than 100 mass ppm based on the total amount of the non-aqueous ink jet composition.

3. The non-aqueous ink jet composition according to claim 1, wherein the first inorganic metal is at least one of sodium, potassium, and calcium.

4. The non-aqueous ink jet composition according to claim 1, wherein the glycol ethers include a glycol diether represented by Formula (1):

$$R^1O\!-\!(R^3O)_m\!-\!R^2 \quad (1),$$

where $R^1$ and $R^2$ each independently represent an alkyl group having 1 to 7 carbon atoms, $R^3$ represents an alkylene group having 1 to 3 carbon atoms, and m represents an integer of 1 to 7.

5. The non-aqueous ink jet composition according to claim 1, wherein the glycol ethers include a glycol monoether represented by Formula (2):

$$OH\!-\!(R^5O)_n\!-\!R^4 \quad (2),$$

where $R^4$ represents an alkyl group having 1 to 7 carbon atoms, $R^5$ represents an alkylene group having 1 to 3 carbon atoms, and n represents an integer of 1 to 7.

6. The non-aqueous ink jet composition according to claim 1, wherein the amount of the pigment component is 1.0 mass % or more and 5.0 mass % or less based on the total amount of the non-aqueous ink jet composition.

7. The non-aqueous ink jet composition according to claim 1, wherein the amount of the glycol ethers is 10 mass % or more and 90 mass % or less based on the total amount of the non-aqueous ink jet composition.

8. The non-aqueous ink jet composition according to claim 1, wherein the organic solvent further contains a cyclic lactone.

9. The non-aqueous ink jet composition according to claim 1, further comprising a vinyl chloride-based resin.

10. An ink jet recording method comprising:
performing recording on a recording medium by an ink jet method using the non-aqueous ink jet composition according to claim 1.

11. The non-aqueous ink jet composition according to claim 1, wherein the at least one of alkali metals and alkaline earth metals includes barium.

\* \* \* \* \*